US012777253B2

(12) United States Patent
Matsushita et al.

(10) Patent No.: US 12,777,253 B2
(45) Date of Patent: Oct. 27, 2026

(54) SHAKE CORRECTION DEVICE AND IMAGING APPARATUS

(71) Applicant: FUJIFILM Corporation, Tokyo (JP)

(72) Inventors: Shuhei Matsushita, Saitama (JP); Atsushi Matsushima, Saitama (JP); Masahiko Miyata, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/818,571

(22) Filed: Aug. 28, 2024

(65) Prior Publication Data

US 2025/0080848 A1 Mar. 6, 2025

(30) Foreign Application Priority Data

Aug. 31, 2023 (JP) ................................ 2023-141057

(51) Int. Cl.
*H04N 23/68* (2023.01)

(52) U.S. Cl.
CPC ................................ *H04N 23/687* (2023.01)

(58) Field of Classification Search
CPC ......................... H04N 23/687; H04N 23/6812
See application file for complete search history.

(56) References Cited

U.S. PATENT DOCUMENTS

| | | | | |
|---|---|---|---|---|
| 2011/0286099 | A1* | 11/2011 | Shiraki | G02B 7/023 359/557 |
| 2017/0155847 | A1* | 6/2017 | Ito | F16M 13/022 |
| 2019/0219892 | A1* | 7/2019 | Park | H04N 23/51 |
| 2021/0306531 | A1* | 9/2021 | Toda | H04N 23/687 |

FOREIGN PATENT DOCUMENTS

| | | |
|---|---|---|
| JP | 2021135401 | 9/2021 |

* cited by examiner

*Primary Examiner* — Mekonnen D Dagnew
(74) *Attorney, Agent, or Firm* — JCIPRNET

(57) ABSTRACT

An embodiment according to the present disclosed technology provides a shake correction device that corrects an image shake by moving a movable member including an imaging element and an imaging apparatus including the shake correction device. A shake correction device includes a magnet and a Hall element for position detection, and a flexible substrate that connects a movable member to which an imaging element is attached and a fixation member to each other, in which the flexible substrate is disposed between the Hall element and the magnet.

13 Claims, 20 Drawing Sheets

SHAKE CORRECTION DEVICE AND IMAGING APPARATUS

CROSS-REFERENCE TO RELATED APPLICATION

The present application claims priority under 35 U.S.C § 119 (a) to Japanese Patent Application No. 2023-141057 filed on Aug. 31, 2023, which is hereby expressly incorporated by reference, in its entirety, into the present application.

BACKGROUND OF THE INVENTION

1. Field of the Invention

The present invention relates to a shake correction device that is used to perform image shake correction and an imaging apparatus including the shake correction device.

2. Description of the Related Art

Disclosed in JP2021-135401 A is a shake correction device including a movable unit that includes an imaging element, upper and lower fixation portions, and a flexible substrate that electrically connects the imaging element to a control substrate to each other.

SUMMARY OF THE INVENTION

An embodiment according to the present disclosed technology provides a shake correction device that corrects an image shake by moving a movable member including an imaging element and an imaging apparatus including the shake correction device.

A first aspect of the present invention provides a shake correction device including a magnet and a Hall element for position detection and a flexible substrate that connects a movable member to which an imaging element is attached and a fixation member to each other, in which the flexible substrate is disposed between the Hall element and the magnet.

A second aspect according to the present invention provides the shake correction device according to the first aspect, in which the flexible substrate is a flexible substrate for supply of power to the imaging element.

A third aspect according to the present invention provides the shake correction device according to the second aspect, further including, in addition to the flexible substrate for supply of power, a flexible substrate for data communication through which communication of imaging data with respect to the imaging element is performed and a flexible substrate for a drive signal through which a drive signal is transmitted to the movable member.

A fourth aspect according to the present invention provides the shake correction device according to any one of the first to third aspects, in which the flexible substrate includes a tilt portion and an overlap region where the Hall element and the tilt portion overlap each other at least partially in a view of the imaging element as seen in an optical axis direction is provided.

A fifth aspect according to the present invention provides the shake correction device according to the fourth aspect, in which the tilt portion is diagonally connected to a connector portion.

A sixth aspect according to the present invention provides the shake correction device according to any one of the first to fifth aspects, in which the flexible substrate includes a slit and at least a portion of the Hall element is disposed in the slit in a view of the imaging element as seen in an optical axis direction.

A seventh aspect according to the present invention provides the shake correction device according to any one of the first to sixth aspects, in which the Hall element is disposed in a region of the imaging element in a view of the imaging element as seen in an optical axis direction.

An eighth aspect according to the present invention provides the shake correction device according to the seventh aspect, in which the Hall element is disposed in a pixel region of the imaging element.

A ninth aspect according to the present invention provides the shake correction device according to the first aspect, in which the flexible substrate includes a first wiring line through which a current flows in a first direction and a second wiring line through which a current flows in a second direction and the first wiring line and the second wiring line are alternately disposed.

A tenth aspect according to the present invention provides the shake correction device according to the first or second aspect, in which the flexible substrate includes a first wiring portion where a collection of first wiring lines through which currents flow in a first direction is disposed and a second wiring portion where a collection of second wiring lines through which currents flow in a second direction is disposed and the first wiring portion and the second wiring portion are disposed to be adjacent to each other.

An eleventh aspect according to the present invention provides the shake correction device according to the tenth aspect, in which the first wiring portion is disposed at a position farther from the Hall element than the second wiring portion is.

A twelfth aspect according to the present invention provides the shake correction device according to the eleventh aspect, in which the flexible substrate includes a slit portion in a region where the second wiring portion is disposed.

A thirteenth aspect of the present invention provides an imaging apparatus including the shake correction device according to any one of the first to twelfth aspects and an optical system that forms an optical image of a subject on the imaging element.

DESCRIPTION OF THE PREFERRED EMBODIMENTS

Hereinafter, an embodiment of the present invention will be described with reference to the drawings.

Figure 1:
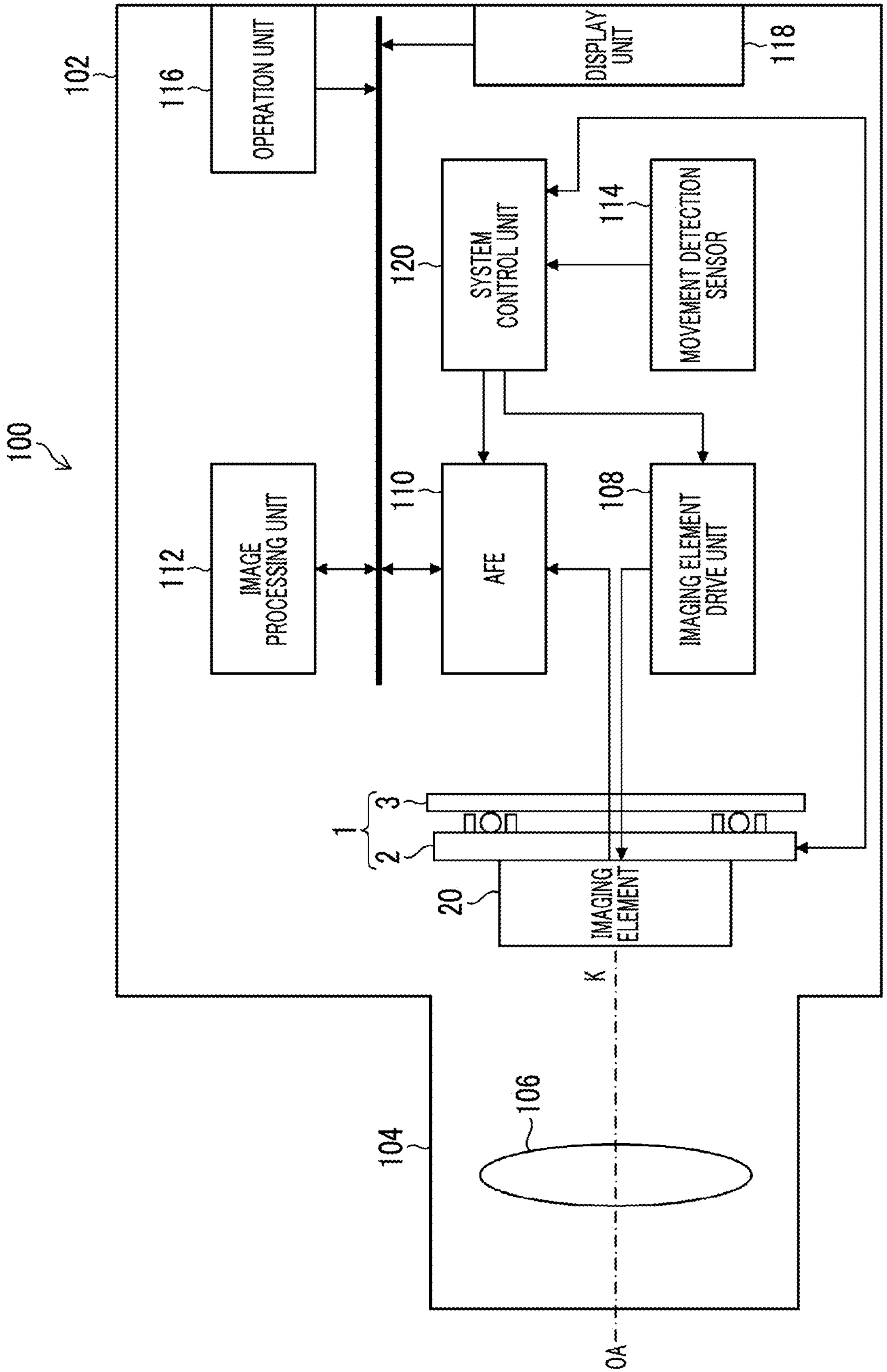
FIG. 1 is a diagram showing a schematic configuration of a camera that is an embodiment of an imaging apparatus.

FIG. 1 is a diagram showing a schematic configuration of a digital camera 100 that is an embodiment of an imaging apparatus according to the embodiment of the present invention.

The digital camera (hereinafter, abbreviated to a "camera") 100 shown in FIG. 1 is composed of a camera body 102 and a lens 104 provided at the camera body 102. Although the camera 100 of the present example is a camera in which the lens 104 is attachable and detachable (replaceable) with respect to the camera body 102, the camera 100 may be a camera integrated with a lens.

The camera 100 includes the camera body 102 and the lens 104 including an imaging optical system 106.

The camera body 102 includes a shake correction device 1, an imaging element drive unit 108 that drives an imaging element 20, an analog front end (AFE) 110, an image processing unit 112, a movement detection sensor 114, an operation unit 116, a display unit 118, and a system control unit 120 that collectively controls the entire camera 100.

The shake correction device 1 includes a movable member 2 including the imaging element 20 and a fixation member 3 that movably supports the movable member 2. The shake correction device 1 is an example of a shake correction device according to the embodiment of the present invention.

The imaging optical system 106 includes a lens group and a stop, and forms an optical image of a subject on the imaging element 20 by partially moving the lens group along an optical axis or by moving the entire lens group along the optical axis.

The imaging element 20 images a subject through the imaging optical system 106 and the imaging element 20 includes a semiconductor chip on which a complementary metal oxide semiconductor (CMOS) image sensor, a charge coupled device (CCD) image sensor, or the like is formed and a package that accommodates the semiconductor chip.

As will be described later, a light-receiving surface 20A (refer to FIG. 3) of the imaging element 20 is configured in a rectangular shape. The light-receiving surface 20A refers to a pixel region T1 (refer to FIG. 18) of the imaging element 20 and is a region of which the surface area is smaller than the surface area of a region T2 of the imaging element 20 including the package.

The shake correction device 1 includes the movable member 2 including the imaging element 20 and the fixation member 3 that supports the movable member 2 and that is fixed to the camera body 102. The fixation member 3 supports the movable member 2 to be movable in a plane intersecting an optical axis K of the imaging element 20. In the present embodiment, the movable member 2 is supported to be movable in a plane orthogonal to the optical axis K of the imaging element 20. The expression "a plane being orthogonal to the optical axis" also means a plane that can be counted as being substantially orthogonal to the optical axis.

The shake correction device 1 corrects an image shake of a captured image captured by the imaging element 20 by moving the light-receiving surface 20A of the imaging element 20 within the plane orthogonal to the optical axis K of the imaging element 20 (within the plane intersecting the optical axis K). The optical axis K of the imaging element 20 is a virtual straight line that extends through a center P of the light-receiving surface 20A of the imaging element 20 and is orthogonal to the light-receiving surface 20A.

In the present specification, a state where an optical axis OA of the imaging optical system 106 and the optical axis K of the imaging element 20 are positioned on the same axis will be referred to as a standard state. In the standard state, the center P of the light-receiving surface 20A of the imaging element 20 is positioned on the optical axis OA of the imaging optical system 106.

Although details of the configuration of the shake correction device 1 will be described later, the shake correction device 1 corrects an image shake by moving, with respect to the fixation member 3, the movable member 2 including the imaging element 20 in three directions which are a direction X, which is a longitudinal direction of the light-receiving surface 20A of the imaging element 20 in the standard state described above, a direction Y, which is a lateral direction of the light-receiving surface 20A, and a direction θ, which is a direction (a rotation direction around the optical axis K) around an optical axis.

The AFE 110 performs predetermined analog signal processing on an imaging signal output from the imaging element 20. Thereafter, the AFE 110 converts the result of the analog signal processing into a digital signal and outputs the digital signal.

The image processing unit 112 generates captured image data by performing digital signal processing on the imaging signal processed by the AFE 110.

The movement detection sensor 114 is a sensor for detection of the movement of the camera 100 (the camera body 102) and is composed of an acceleration sensor or an angular velocity sensor or is composed of both of an acceleration sensor and an angular velocity sensor.

The system control unit 120 controls the imaging element drive unit 108 and the AFE 110 such that a subject is imaged by the imaging element 20 and an imaging signal corresponding to a subject image is output from the imaging element 20.

The operation unit 116 includes various operation members such as a release switch for managing the timing of the driving of a shutter (not shown), a user interface unit for various settings of an imaging mode or the like with respect to the camera 100, and a power switch.

The display unit 118 is provided on a rear surface of the camera body 102 and displays a live view image, a reproduced image, information (menu) related to operation, or the like. A user interface unit (not shown) of the operation unit 116 also includes a touch panel that is disposed to overlap the display unit 118.

The system control unit 120 controls the shake correction device 1 based on movement information of the camera 100 detected by the movement detection sensor 114. The system control unit 120 controls the movement of the movable member 2 including the imaging element 20 such that the light-receiving surface 20A of the imaging element 20 is moved in at least one of the direction X, the direction Y, or the direction θ and thus an image shake of a captured image captured by the imaging element 20 is corrected.

In a case where a shake correction function is ON and there is no movement of the camera 100 detected by the movement detection sensor 114, the system control unit 120 controls the operation of the shake correction device 1 such that the position of the light-receiving surface 20*a* of the imaging element 20 becomes the position thereof in the standard state. Note that in a case where the shake correction function is OFF, the system control unit 120 controls the operation of the shake correction device 1 such that the position of the light-receiving surface 20A of the imaging element 20 is maintained at the position thereof in the standard state.

Processor

In the embodiment described above, the hardware structures of processing units that perform various kinds of processing in the imaging element drive unit 108, the AFE 110, the image processing unit 112, and the system control unit 120 are various processors as described below.

The various processors include a central processing unit (CPU) that is a general-purpose processor functioning as various processing units by executing software (a program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to perform specific processing, and the like.

One processing unit may be composed of one of the various processors and may be composed of two or more same types of processors or two or more different types of processors (for example, a plurality of FPGAs or a combination of a CPU and an FPGA). In addition, a plurality of processing units may be composed of one processor.

As examples of a configuration in which a plurality of processing units are composed of one processor, firstly, there is a configuration in which one processor is composed of a combination of one or more CPUs and software and the processor functions as a plurality of processing units as represented by a computer such as a client, a server, or the like. Secondly, as represented by a system-on-chip (SoC), there is a configuration in which a processor that realizes, with one integrated circuit (IC), the functions of the entire system including a plurality of processing units is used. As described above, various processing units are configured by using one or more of the above-described various processors as the hardware structure.

Furthermore, the hardware structure of the various processors is, more specifically, an electric circuit (circuitry) in which circuit elements such as semiconductor elements are combined with each other.

Each of the above-described configurations and functions can be appropriately realized by any hardware, software, or a combination of any hardware and software. For example, application to a program that causes a computer to perform the above-described processing steps (processing procedure), a computer-readable recording medium (non-temporary recording medium) in which such a program is recorded, and a computer into which such a program can be installed is also possible.

Figure 2:
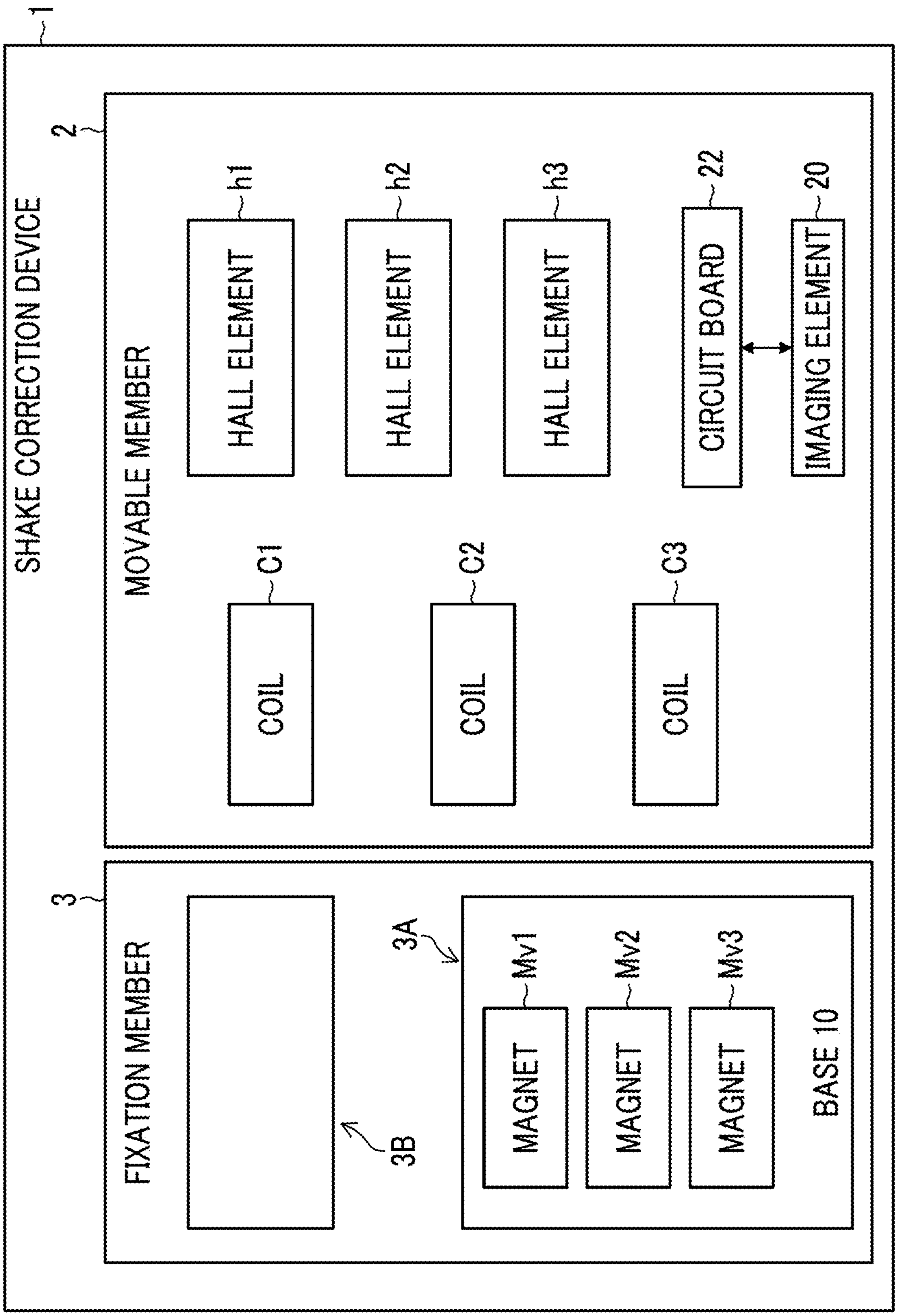
FIG. 2 is a functional block diagram showing an aspect of an internal configuration of the camera.

FIG. 2 is a functional block diagram showing a schematic configuration of the shake correction device 1 in the camera 100 shown in FIG. 1.

As shown in FIG. 2, the shake correction device 1 includes the movable member 2 that is movable in each of the direction X, the direction Y, and the direction θ, and the fixation member 3 that supports the movable member 2 to be movable in each of the direction X, the direction Y, and the direction θ.

The movable member 2 includes a circuit board 22 to which the imaging element 20 is attached (mounted), a coil C1 for an X axis-cum-rotation driving operation, a coil C2 for an X axis-cum-rotation driving operation, and a coil C3 for a Y axis driving operation.

In addition, the movable member 2 includes Hall elements h1, h2, and h3 constituting a Hall sensor for position detection. Output signals of the Hall elements h1, h2, and h3 are input to the system control unit 120 (refer to FIG. 1). The system control unit 120 controls, based on the output signals from the Hall elements h1, h2, and h3, each of control currents flowing to the coils C1, C2, and C3 to move the movable member 2 such that an image shake is corrected.

The fixation member 3 includes yokes 3A and 3B as described later. The yoke 3A includes magnets Mv1 for an X axis-cum-rotation driving operation, magnets Mv2 for an X axis-cum-rotation driving operation, and magnets Mv3 for a Y axis driving operation (refer to FIG. 5). The yoke 3B is disposed at a position facing the magnets Mv1, the magnets Mv2, and the magnets Mv3 (refer to FIG. 5).

Figure 3:
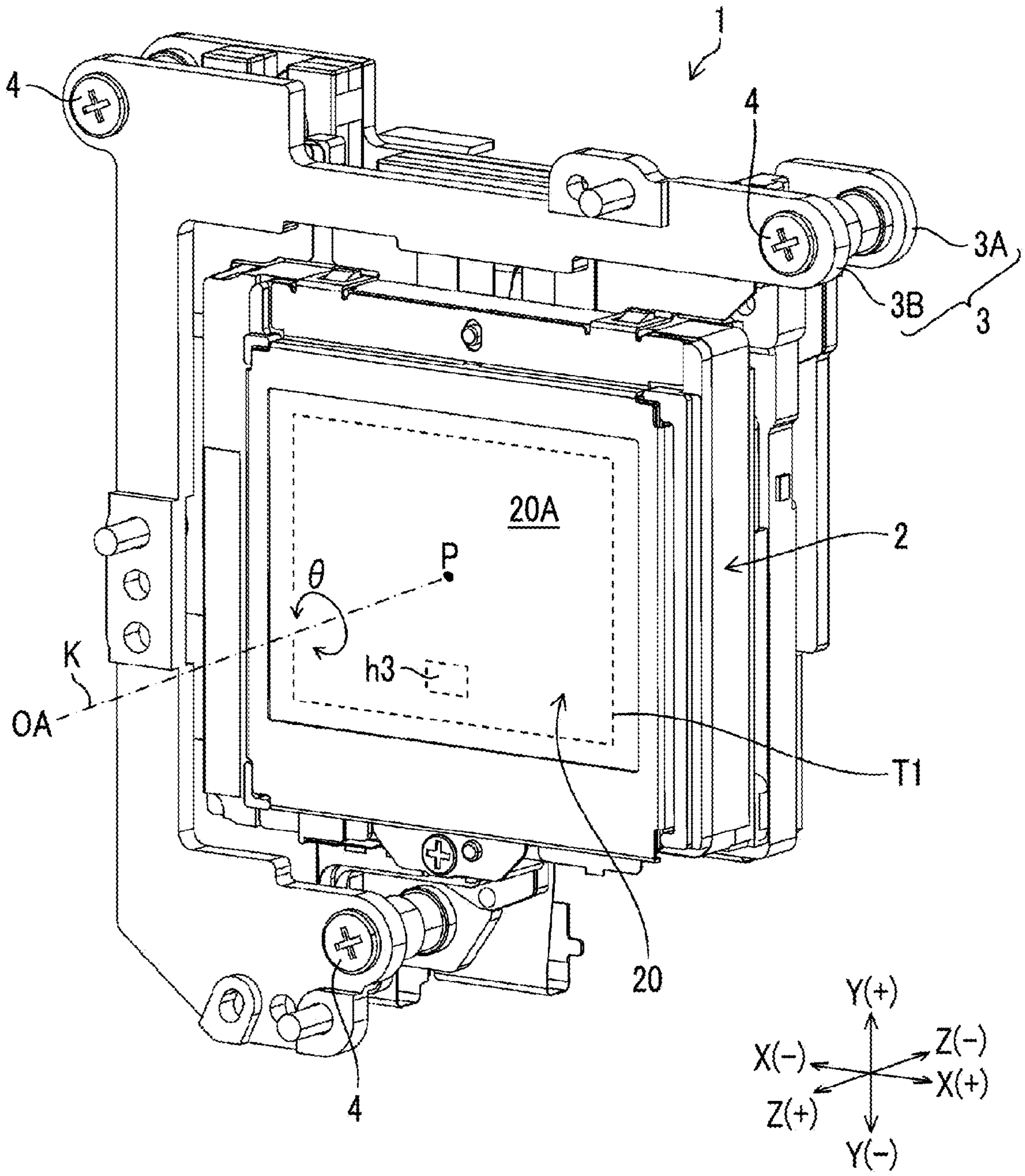
FIG. 3 is a perspective view of a shake correction device as seen from a front surface side.
Figure 4:
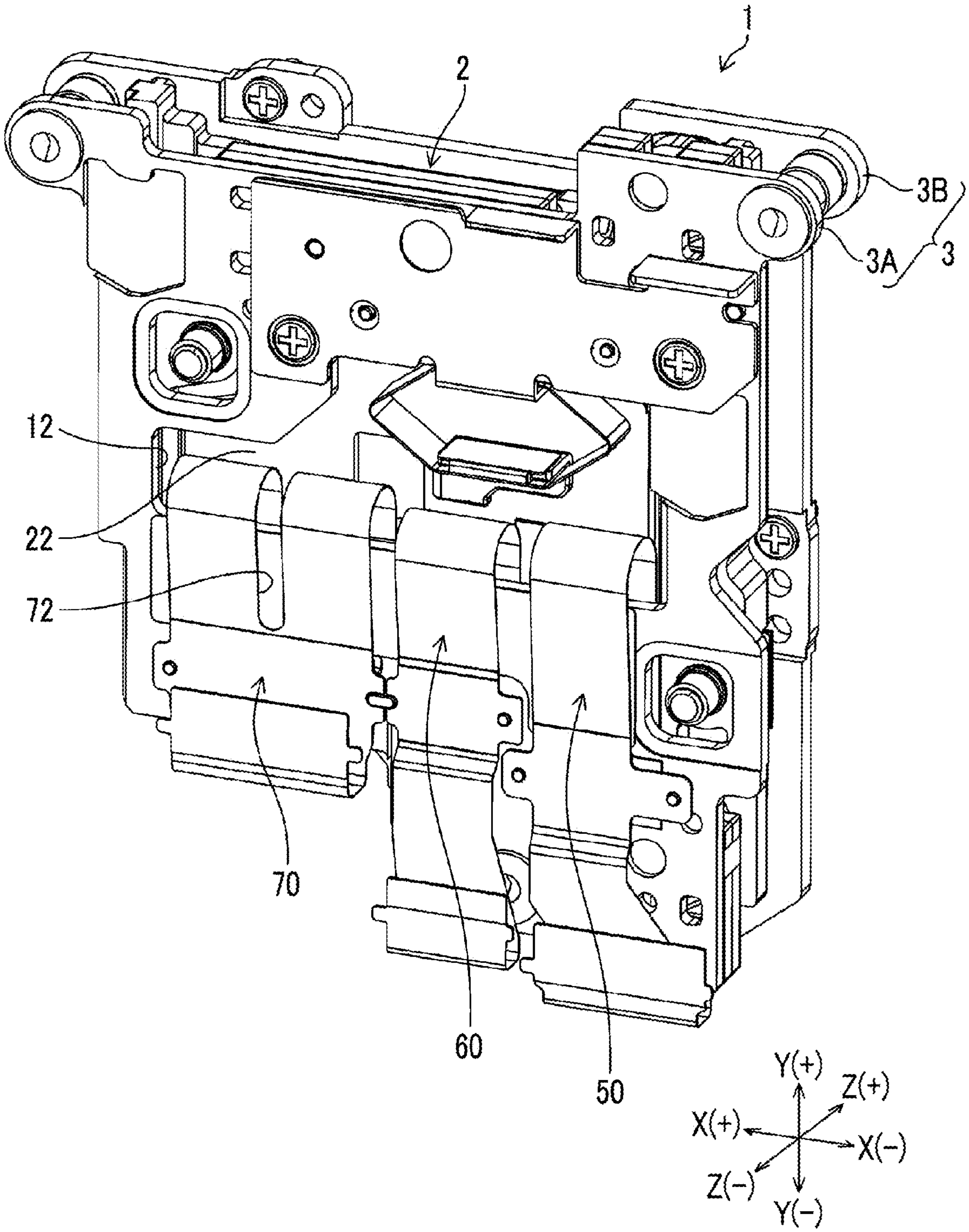
FIG. 4 is a perspective view of the shake correction device as seen from a rear surface side.

FIG. 3 is a perspective view of the shake correction device 1 as seen from a front surface side (hereinafter, abbreviated to a “front surface side”) of the camera body 102. FIG. 4 is a perspective view of the shake correction device 1 as seen from a rear surface side (hereinafter, abbreviated to a “rear surface side”) of the camera body 102. As shown in FIGS. 3 and 4, the shake correction device 1 includes the movable member 2 and the fixation member 3.

The shake correction device 1 includes the movable member 2 to which the circuit board 22, on which the imaging element 20 is mounted, is fixed, and the fixation member 3 including the yokes 3A and 3B.

The yoke 3A is disposed on a rear surface side of the movable member 2. The yoke 3B is disposed on a front surface side of the movable member 2. The yoke 3A and the yoke 3B are fixed to each other by being screwed to each other by means of a plurality of screws 4 in a state where the movable member 2 is sandwiched between the yoke 3A and the yoke 3B.

The shake correction device 1 is fixed to the camera body 102 in a state where the light-receiving surface 20A of the imaging element 20 faces the imaging optical system 106

(refer to FIG. 1). In FIG. 3, the rectangular pixel region T1 of the light-receiving surface 20A is represented by a broken line.

The shake correction device 1 corrects an image shake by moving the movable member 2 in each of the direction θ around the optical axis, the direction X that is the longitudinal direction of the light-receiving surface 20A, and the direction Y that is the lateral direction of the light-receiving surface 20A.

In the following description, a direction parallel to the optical axis K of the imaging element 20 will be referred to as a direction Z. In the embodiment, the movable member 2 moves along a plane (an X-Y plane) that intersects the optical axis K (the direction Z) perpendicularly. AZ (+) direction in the direction Z refers to a direction toward the front surface side, and a Z (−) direction refers to a direction toward the rear surface side.

Regarding the direction X, the movable member 2 is movable in an X (+) direction (a leftward direction) and in an X (−) direction (a rightward direction) by the same distance in the standard state. The X (+) direction and the X (−) direction refer to directions related to a case where the camera 100 is seen from the rear surface side. The same applies hereinafter.

Regarding the direction Y, the movable member 2 is movable in a Y (+) direction (an upward direction) and in a Y (−) direction (a downward direction) by the same distance in the standard state.

The movable member 2 is rotatable in one direction in the direction θ (a rightward rotation direction) and in the other direction of the direction θ (a leftward rotation direction) by the same distance in the standard state.

In the case of the camera 100 shown in FIG. 1, a posture in which the direction Y is parallel to the direction of gravitational force as shown in FIG. 3 is an upright posture (a posture for so-called horizontal photography).

Figure 5:
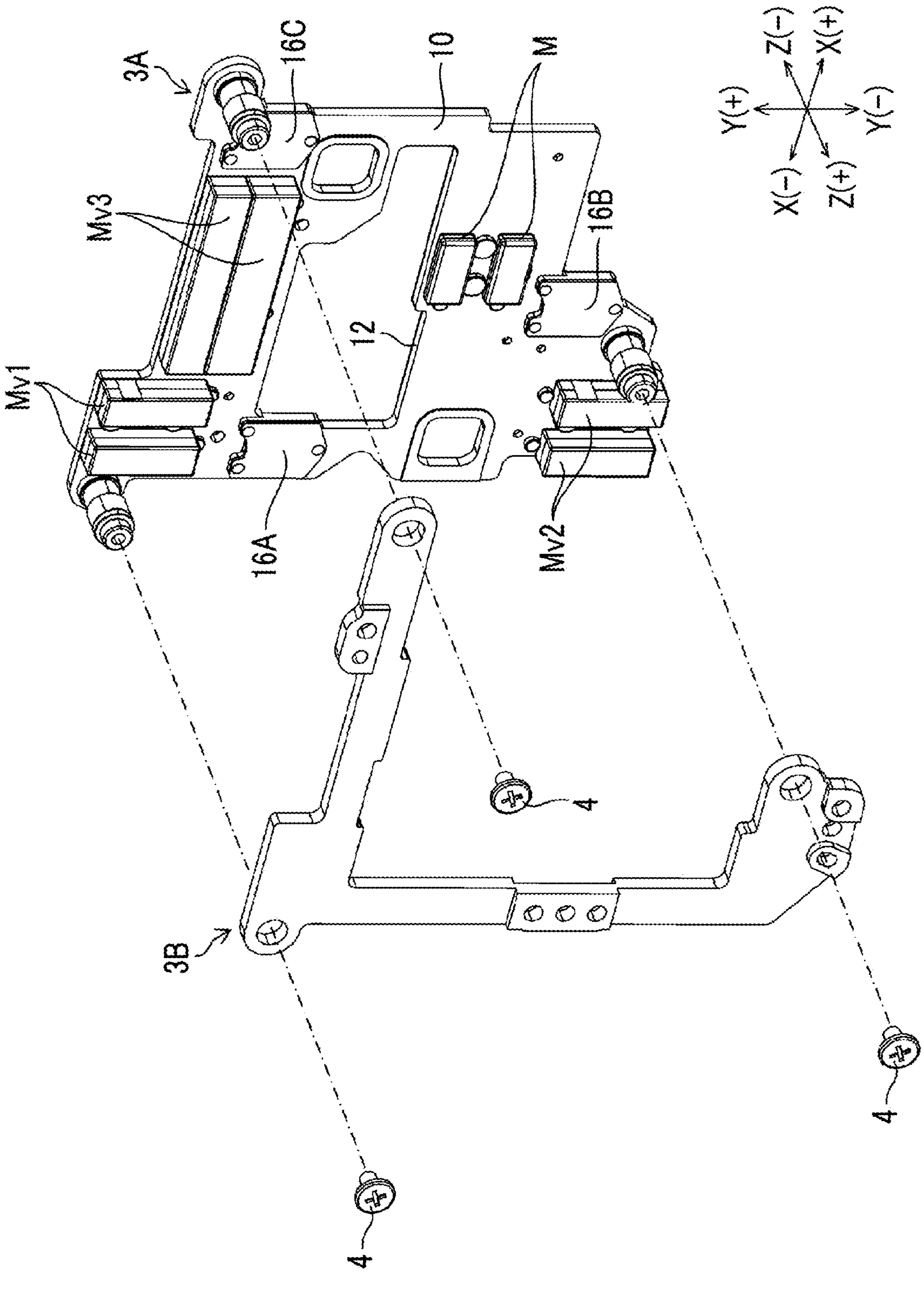
FIG. 5 is an exploded perspective view showing a fixation member of the shake correction device as seen from the front surface side.

FIG. 5 is an exploded perspective view showing the fixation member 3 (the yokes 3A and 3B) of the shake correction device 1, which is shown in FIGS. 3 and 4, as seen from the front surface side.

As shown in FIG. 5, the yoke 3A includes a plate-shaped base 10 having a planar surface perpendicular to the direction Z. In the base 10, a through-hole 12 for insertion and disposition of three flexible printed circuit (FPC) substrates 50, 60, and 70 (refer to FIG. 4) is formed. The FPC substrates 50, 60, and 70 are FPC substrates that connect the movable member 2 and the yoke 3A to each other, and are examples of a flexible substrate according to the embodiment of the present invention.

The yoke 3B is configured in an inverted L-like shape as seen from the front surface side. The yoke 3B is configured in an inverted L-like shape open on a side to which the X (+) direction extends and a side to which the Y (−) direction extends as seen from the front surface side.

The magnets Mv1 and Mv2 are fixed, at an interval in the direction Y, to a surface of a portion of the yoke 3A that extends along the direction Y on the front surface side.

The magnets Mv3 are fixed to a surface of a portion of the yoke 3A that extends along the direction X on the front surface side.

The yoke 3B is disposed at a position overlapping the magnets Mv1, Mv2, and Mv3 as seen from the front surface side, so that magnetic flux leakage to the vicinity of the yoke 3B is prevented. The shape of the yoke 3B is not limited to an approximately L-like shape and may be an approximately U-like shape as long as the yoke 3B overlaps the magnets Mv1, Mv2, and Mv3.

A front surface of the yoke 3A is provided with planar plates 16A, 16B, and 16C perpendicular to the direction Z. All of the planar plates 16A, 16B, and 16C are at the same position in the direction Z and are formed on the same plane. These planar plates 16A, 16B, and 16C will be described below.

Figure 6:
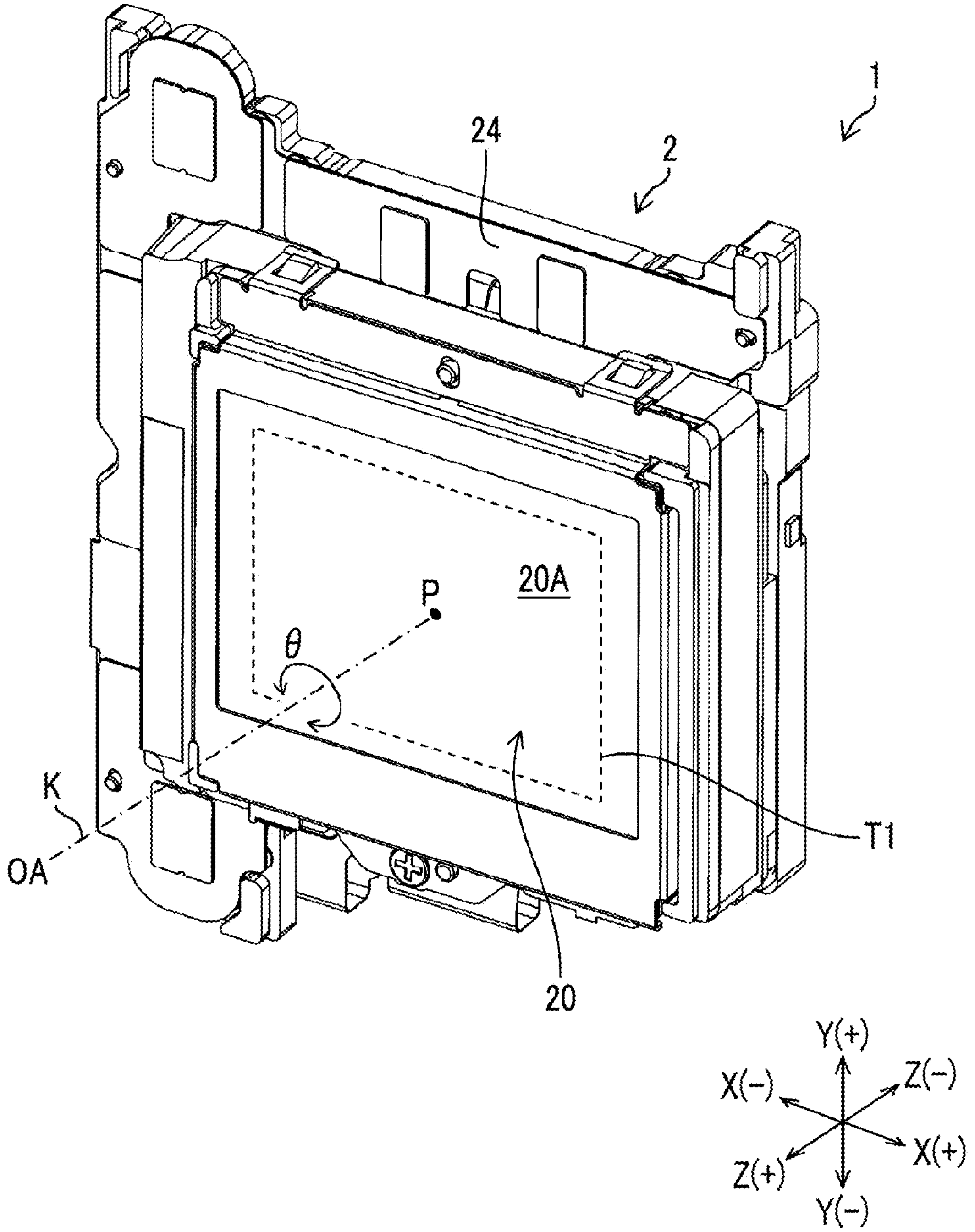
FIG. 6 is a perspective view of a movable member of the shake correction device as seen from the front surface side.
Figure 7:
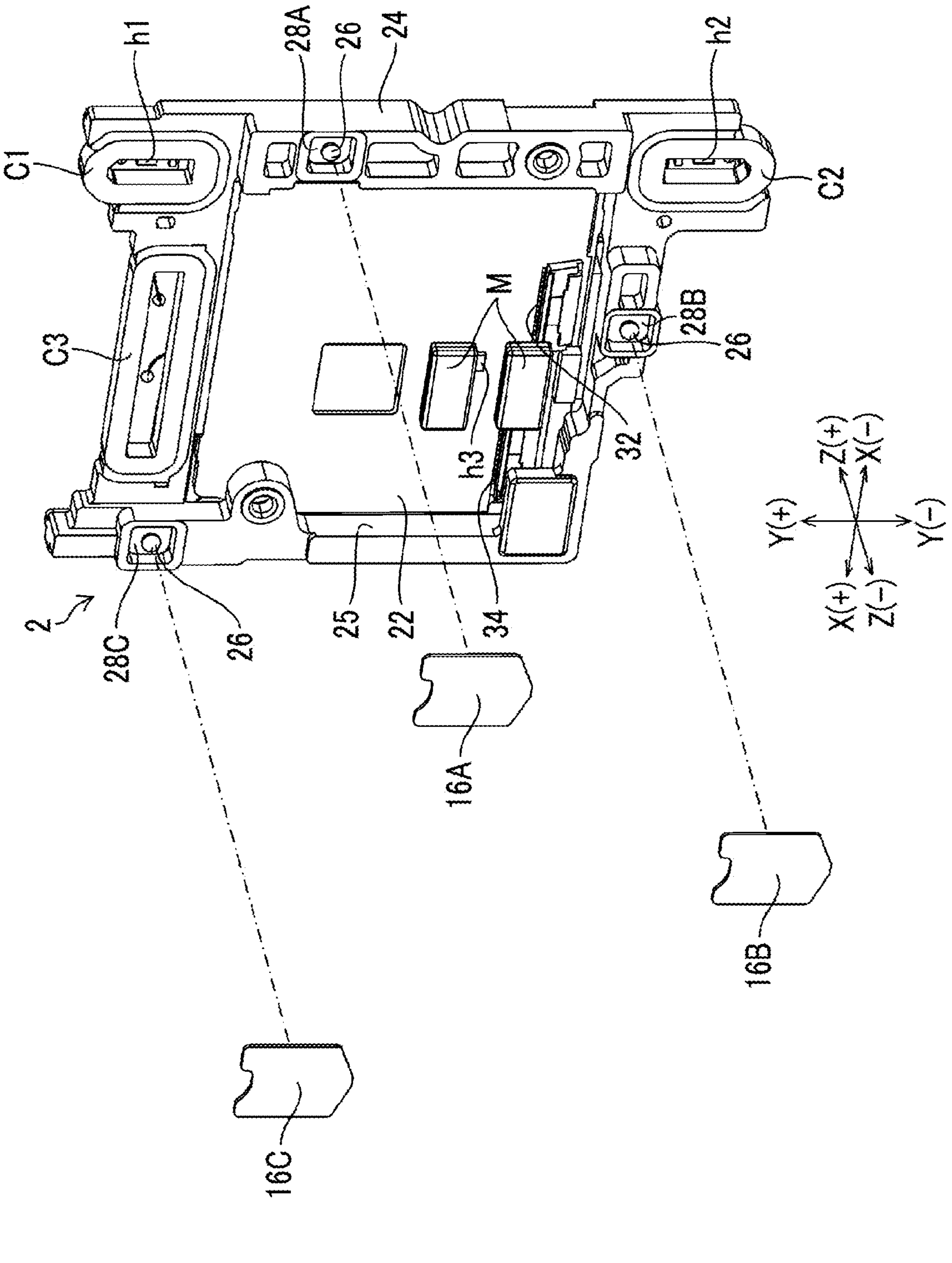
FIG. 7 is a perspective view of the movable member as seen from the rear surface side.

FIG. 6 is a perspective view of the movable member 2 of the shake correction device 1 shown in FIGS. 3 and 4 as seen from the front surface side. FIG. 7 is a perspective view of the movable member 2 shown in FIG. 6 as seen from the rear surface side.

As shown in FIGS. 6 and 7, the movable member 2 includes a base 24 to which the circuit board 22 is fixed and that has a rectangular shape. As shown in FIG. 7, the base 24 includes an opening portion 25 through which a portion of the circuit board 22 is exposed on the rear surface side.

Figure 8:
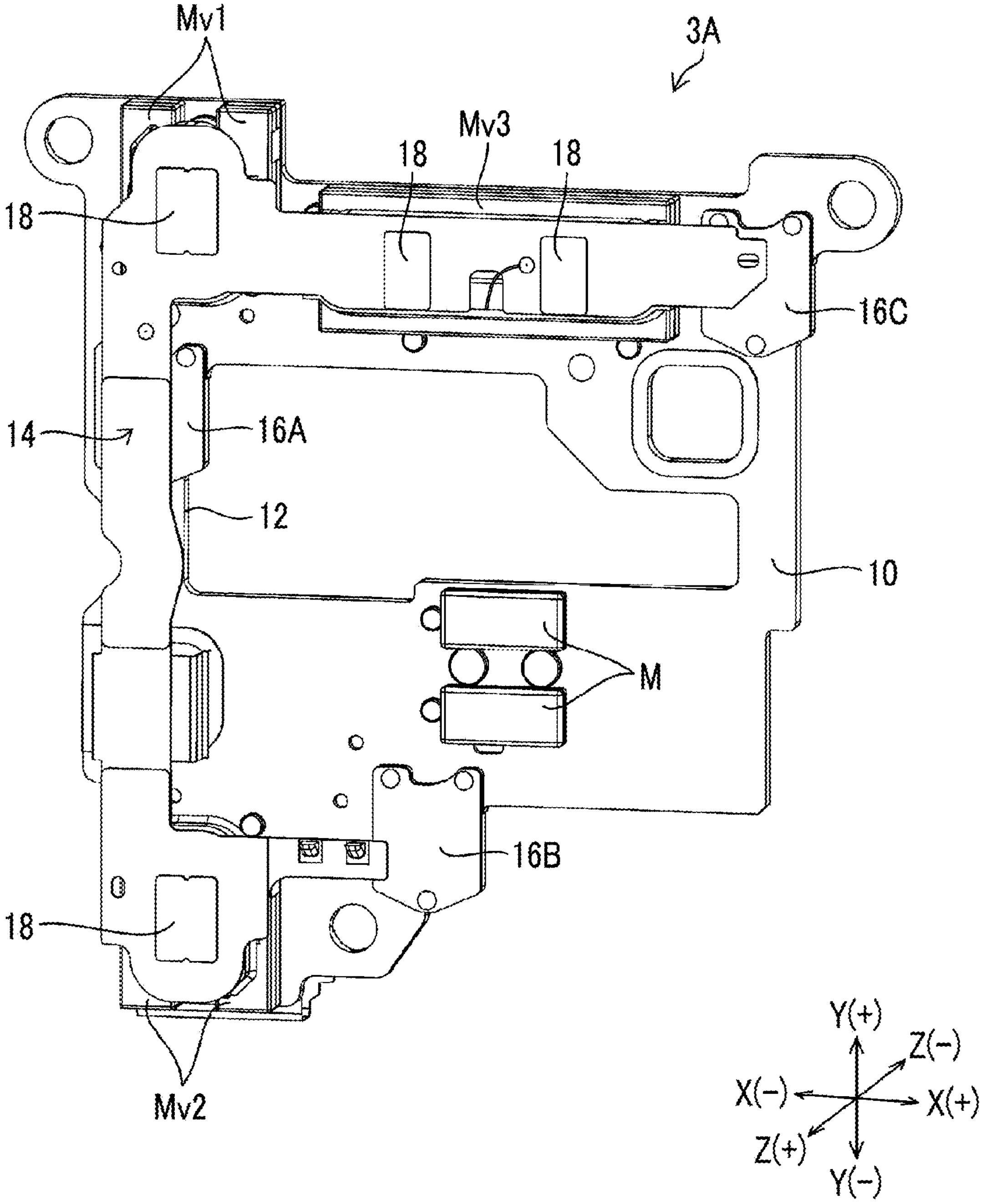
FIG. 8 is a perspective view of an FPC substrate and a yoke of the movable member.

FIG. 8 is a perspective view of the yoke 3A and an FPC substrate 14 (the FPC substrate 14 having a wiring line for supply of a control current to the coils C1, C2, and C3) attached to the movable member 2 as seen from the front surface side. The FPC substrate 14 is configured integrally with the FPC substrate 50 (refer to FIG. 4).

Figure 9:
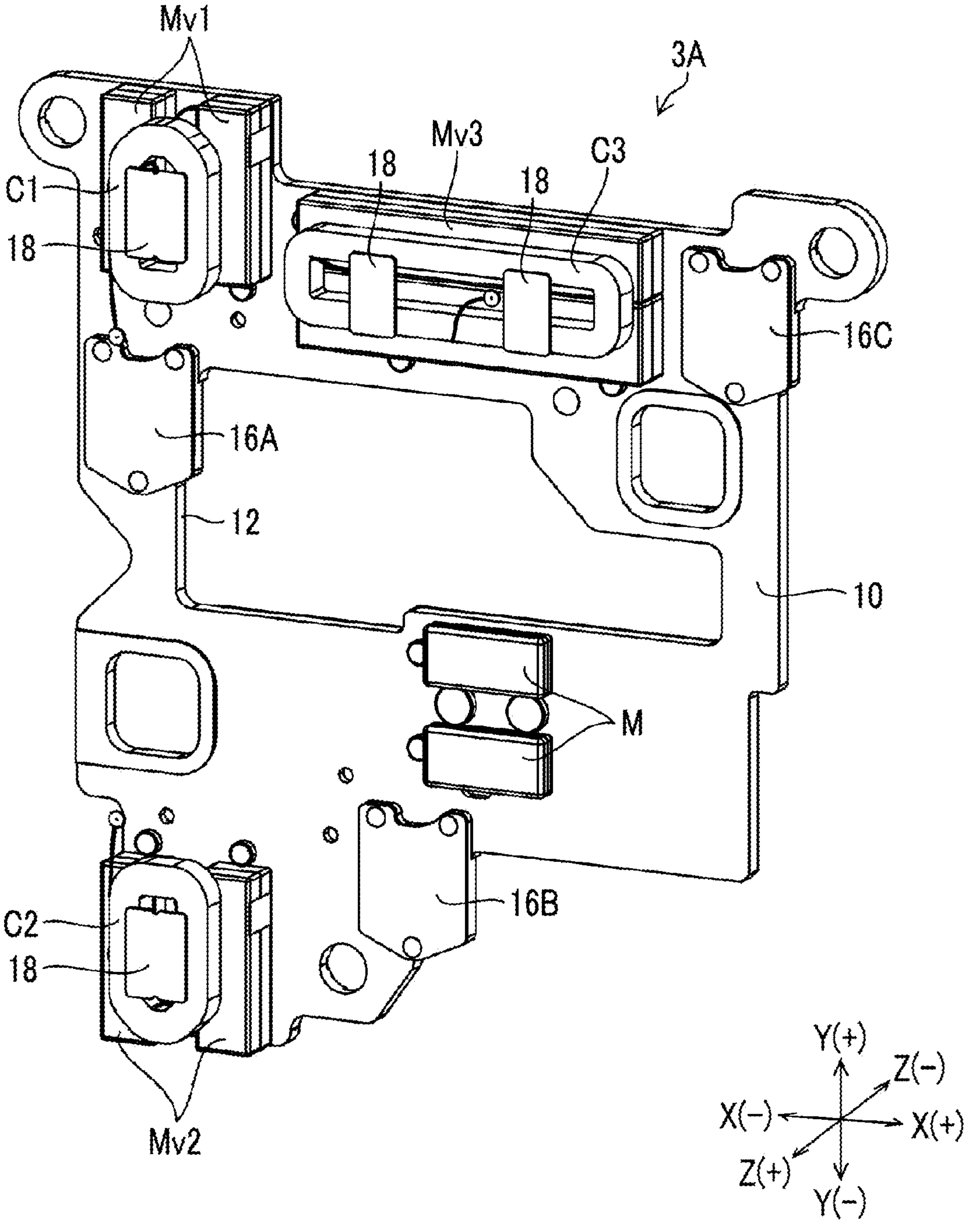
FIG. 9 is a perspective view of the yoke as seen from the front surface side.

FIG. 9 is a perspective view of the yoke 3A as seen from the front surface side. In addition, FIG. 9 also shows the coils C1, C2, and C3 disposed at the FPC substrate 14 (refer to FIG. 8).

As shown in FIG. 9, the coil C1 is disposed at a position facing the magnets Mv1, the coil C2 is disposed at a position facing the magnets Mv2, and the coil C3 is disposed at a position facing the magnets Mv3.

The coil C1 and the magnets Mv1 constitute a voice coil motor (VCM) for an X axis driving operation.

The VCM for an X axis driving operation causes a control current to flow to the coil C1 to move the movable member 2 in the direction X by means of Lorentz force between the coil C1 and the magnets Mv1.

The coil C2 and the magnets Mv2 constitute a VCM. This VCM and the VCM for an X axis driving operation described above constitute a VCM for a rotation driving operation.

The VCM for a rotation driving operation makes a direction in which a control current flows to the coil C1 and a direction in which a control current flows to the coil C2 opposite to each other so as to rotate the movable member 2 around the optical axis K with the center P of the light-receiving surface 20A as the center of the rotation by means of Lorentz force between the coil C1 and the magnets Mv1 and Lorentz force between the coil C2 and the magnets Mv2.

The coil C3 and the magnets Mv3 constitute a VCM for a Y axis driving operation.

The VCM for a Y axis driving operation causes a control current to flow to the coil C3 to move the movable member 2 in the direction Y by means of Lorentz force between the coil C3 and the magnets Mv3.

As shown in FIG. 7, the Hall element h1 is disposed at the center of the coil C1, and the Hall element h2 is disposed at the center of the coil C2. In addition, the Hall element h3 is disposed at the center of a space between magnets M for position detection. The magnets M are fixed to the base 10 of the yoke 3A (refer to FIG. 9). The Hall element h3 is fixed to the circuit board 22.

The Hall element h1 is fixed at a position facing an intermediate position between the S poles and the N poles of the magnets Mv1 (refer to FIG. 5).

The Hall element h2 is fixed at a position facing an intermediate position between the S poles and the N poles of the magnets Mv2.

The Hall element h3 is fixed at a position facing an intermediate position between the S poles and the N poles of the magnets M. In addition, the Hall element h3 is disposed in the pixel region T1 of the imaging element 20 in a view of the imaging element 20 as seen in a direction along the optical axis K (refer to FIG. 3).

The Hall element h1 outputs a signal corresponding to a magnetic field generated by the magnets Mv1, and the system control unit 120 detects the position of the movable member 2 in the direction X by means of the output change of the signal.

The Hall element h2 outputs a signal corresponding to a magnetic field generated by the magnets Mv2, and the system control unit 120 detects the position of the movable member 2 in the direction X by means of the output change of the signal.

The Hall element h3 outputs a signal corresponding to a magnetic field generated by the magnets M and the system control unit 120 detects the position of the movable member 2 in the direction Y by means of the output change of the signal.

With a change of the output signal of the Hall element h1 and a change of the output signal of the Hall element h2, the system control unit 120 detects the angle of rotation of the movable member 2 around the optical axis K as the position of the movable member 2 in the direction θ.

In addition, as shown in FIG. 8, a plurality of magnetic sticking plates 18 that urge the movable member 2 toward the fixation member 3 by means of magnetic forces of the magnets Mv1, Mv2, and Mv3 are provided on the FPC substrate 14. Since the movable member 2 is urged toward the fixation member 3, the movable member 2 is prevented from rising from the fixation member 3. Accordingly, the movable member 2 is held to be movable with respect to the fixation member 3. Instead of the magnetic sticking plates 18, a coil spring may also be applied. In addition, a combination of a coil spring and a magnetic sticking plate may also be used.

As shown in FIG. 7, at the base 24 of the movable member 2, recess portions 28A, 28B, and 28C are disposed at positions facing the planar plates 16A, 16B, and 16C of the yoke 3A. A bottom surface of each of the recess portions 28A, 28B, and 28C is composed of a flat surface perpendicular to the direction Z. The recess portions 28A, 28B, and 28C each accommodate a rolling body 26 that is provided to support the movable member 2 to be movable in the X-Y plane.

All of the respective bottom surfaces of the recess portions 28A, 28B, and 28C are at the same position in the direction Z and are formed on the same plane. In the present example, the three bottom surfaces are disposed on the same plane. However, the three bottom surfaces do not need to be disposed on the same plane as long as the three bottom surfaces are in a positional relationship of being parallel to each other. The movable member 2 smoothly moves in a plane (the X-Y plane) perpendicular to the direction Z because of the rolling motion of the above-described three rolling bodies 26.

As shown in FIG. 7, connectors 32 and 34 are disposed on the rear surface side of the movable member 2.

The connectors 32 and 34 are disposed along the direction X at an end portion of the circuit board 22 that is on a side to which the Y (−) direction extends. The connector 32 is a connector provided for high-speed communication. The connector 34 is a connector provided to drive the imaging element.

The FPC substrate 60 (refer to FIG. 4), which is a flexible substrate, is connected to the connector 32. The FPC substrate 60 is a data communication FPC substrate that includes a wiring line for communication of imaging data (image data obtained through imaging (so-called RAW data)) between the imaging element 20 and a main board (a board on which the system control unit 120 or the like is formed (not shown)) and the imaging element 20 and the main board are electrically connected to each other via the FPC substrate 60.

The FPC substrate 70 (refer to FIG. 4), which is a flexible substrate, is connected to the connector 34. The FPC substrate 70 is an FPC substrate that includes a wiring line for supply of power to the imaging element 20 and a ground wiring line, and the imaging element 20 and the main board are electrically connected to each other via the FPC substrate 70.

The FPC substrate 50 (refer to FIG. 4), which is a flexible substrate, is an FPC substrate that includes a wiring line provided to drive each VCM, and the respective coils C1, C2, and C3 of the VCMs and the main board are electrically connected to each other via the FPC substrate 50 (including the FPC substrate 14). The FPC substrate 50 is an example of a flexible substrate for a drive signal, through which a drive signal is transmitted to the movable member 2.

Figure 10:
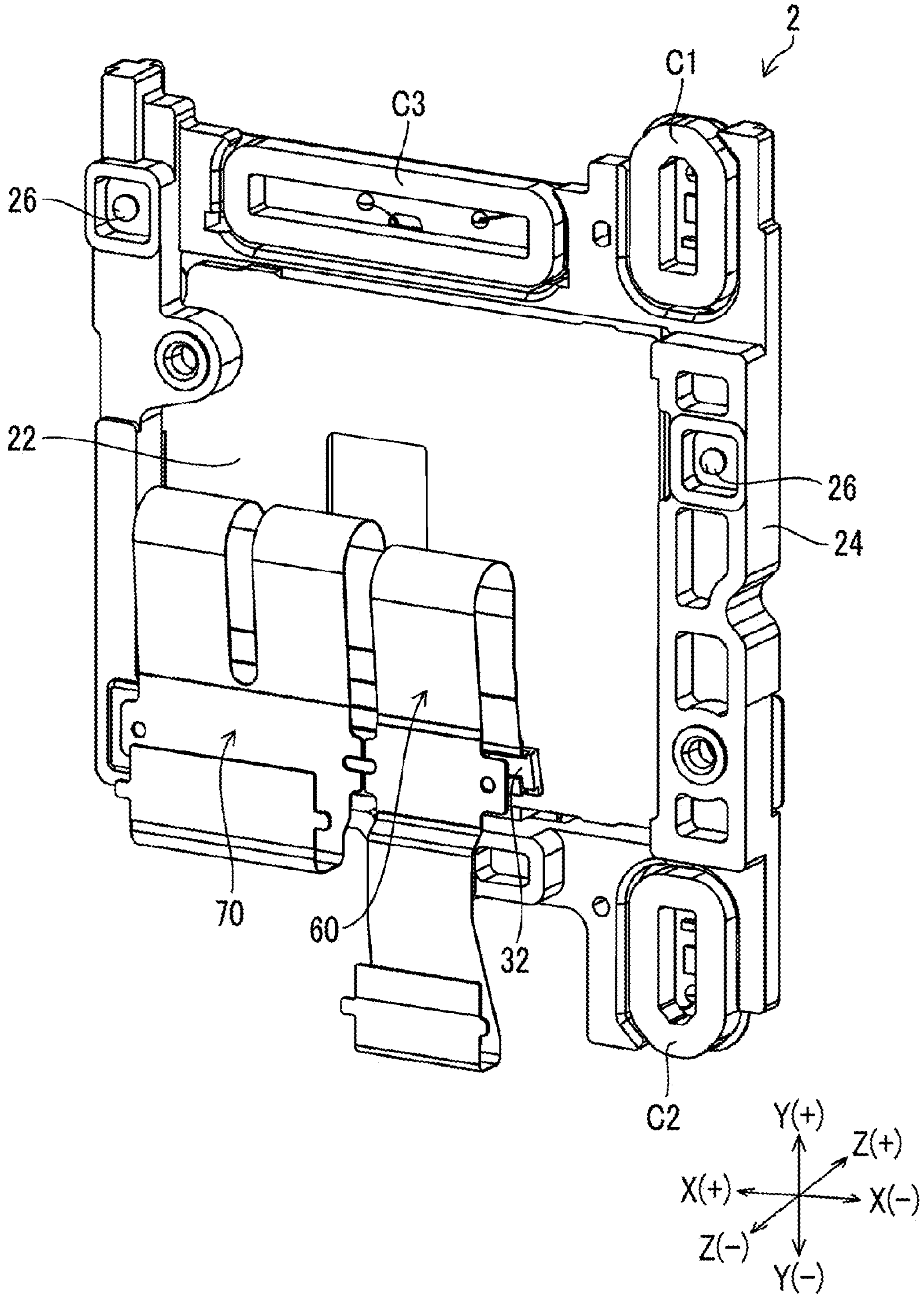
FIG. 10 is a perspective view of the movable member, to which FPC substrates are connected, as seen from the rear surface side.

FIG. 10 is a perspective view of the movable member 2, to which the FPC substrates 60 and 70 are connected, as seen from the rear surface side.

As shown in FIG. 10, each of the FPC substrates 60 and 70 is connected to the movable member 2. One ends of the FPC substrates 60 and 70 are connected to the connectors 32 and 34, respectively. The FPC substrates 60 and 70 are routed to a side, to which the Y (+) direction extends, from the connectors 32 and 34, are routed to the rear surface side of the yoke 3A through the through-hole 12 of the yoke 3A, and are bent, at an intermediate position, to the side to which the Y (−) direction extends, and each of the other end portions the FPC substrates 60 and 70 is connected to the main board. The configuration of the camera 100 of the embodiment is as above.

Here, regarding a digital camera which is an example of the imaging apparatus, a shake correction function is provided as a countermeasure for an image shake caused by a camera shake. In the related art, an optical shake correction mechanism (optical image stabilization: OIS) for a lens is mainstream. However, in recent years, there is an increasing number of types of cameras in which an in-body shake correction mechanism (in-body image stabilization: BIS) that corrects an image shake with an imaging element being driven is installed for performance improvement and size reduction of the camera and the entire lens. Note that a BIS is adopted for the shake correction device 1 of the embodiment as well.

Imaging elements are large because of an increase in the number of pixels and an improvement in image quality processing performance. Therefore, to reduce the size of the BIS, it is necessary to think out disposition of an actuator that drives an imaging element, disposition of a sensor that detects the position of the imaging element, and the way in which an FPC substrate that connects a circuit board of the imaging element and a main board to each other is routed.

In a BIS, a VCM actuator and a Hall sensor are generally used. A magnetic circuit of the VCM actuator is composed of a coil, a magnet, and a yoke and a magnetic circuit of the Hall sensor is composed of a Hall element, a magnet, and a yoke.

In a case where the magnetic circuit of each of the VCM actuator and the Hall sensor is reduced in size, the size of the BIS is reduced. However, there is a problem that the performance of both the VCM actuator and the Hall sensor is degraded. Therefore, the performance of the BIS and size reduction of the BIS are in a trade-off relationship.

In addition, the outer shape, the routing method, and the pattern (wiring line) design of the FPC substrate are related to the performance and size reduction of the BIS. The FPC substrate has a spring reaction force, and to handle a VCM actuator of which a magnetic circuit is small, it is necessary to route the FPC substrate such that the spring reaction force is made small. From the viewpoint of making the spring reaction force of the FPC substrate small, it is desirable to route the FPC substrate such that the degree of bend (curvature) R of the FPC substrate is made equal to or greater than a certain value. However, this is also in a trade-off relationship with the size reduction.

Furthermore, the FPC substrate has a property in which a magnetic field is generated around a pattern through which a current flows. To handle a Hall sensor of which a magnetic circuit is small, it is necessary to route the FPC substrate such that the Hall sensor is less likely to be influenced by electromagnetic noise caused by the pattern of the FPC substrate. In addition, from the viewpoint of reducing the influence of the electromagnetic noise, it is desirable to route the FPC substrate such that the FPC substrate and the Hall element are separated from each other by a distance equal to or greater than a certain value. However, this is also in a trade-off with the size reduction.

Due to such reasons, it is difficult to design the BIS in which the FPC substrate is routed such that both of size reduction and high performance are achieved. Particularly, in the case of a design in which the FPC substrate is routed to be separated from the vicinity of a magnetic circuit of a Hall sensor, it is difficult to reduce the size of the BIS.

Therefore, the present disclosed technology provides a shake correction device and an imaging apparatus with which it is possible to solve the above-described problems. Hereinafter, some means for solving the above-described problems will be described.

In the case of designing the pattern disposition of an FPC substrate such that influence is less likely to be exerted by electromagnetic noise and the way of routing the FPC substrate into a magnetic circuit of a Hall sensor, the influence of the electromagnetic noise from the FPC substrate is to be considered. The influence of the electromagnetic noise can be estimated based on the strength "H" of a magnetic field that is calculated by using Ampere's law of Equation (1) as follows.

$$H=I\cos\theta/2\pi r \qquad \text{(Equation 1)}$$

Figure 11:
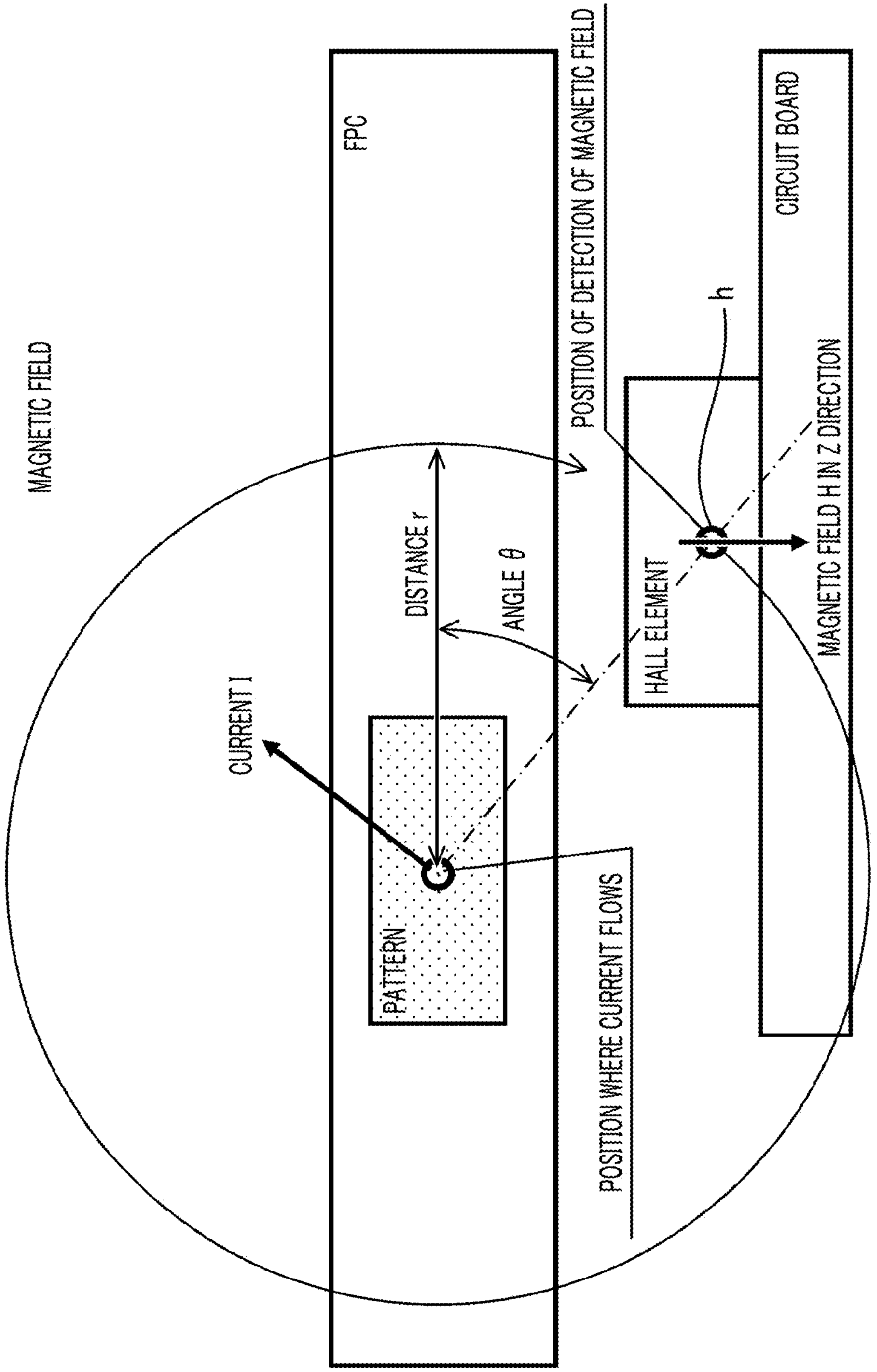
FIG. 11 is a diagram for description of the strength of a magnetic field in a Z direction that is calculated by using Ampere's law.

FIG. 11 is a diagram for description of the strength "H" of a magnetic field in a Z direction that is calculated by using Ampere's law. In FIG. 11, the strength "H" of the magnetic field in the Z direction that enters a Hall element h in a direction at an angle "θ", where "I" is the value of a current flowing to each pattern of an FPC substrate and "r" is a distance between a position where the current flows to the pattern and the position of detection of the magnetic field of the Hall element h.

Based on Ampere's law, to reduce the influence of the electromagnetic noise, Requirements 1, 2, and 3 as follows are to be considered.

Requirement 1: In the case of a pattern to which a current of which the value "I" is high flows, the strength "H" of the magnetic field entering the Hall element h is reduced by increasing the distance "r" between the position at which a current flows and the Hall element h.

Requirement 2: The strength "H" of the magnetic field entering the Hall element h is reduced by combining patterns, at which currents flow in opposite directions, and arranging the patterns in parallel to cancel out the magnetic field.

Requirement 3: The degree of the influence of the strength "H" of the magnetic field entering the Hall element h is made small by increasing the output of the magnetic circuit of the Hall sensor.

Requirements 1 and 2 described above will be examined.

In the case of the shake correction device 1 of the present example for which a BIS is adopted, as shown in FIG. 4, the FPC substrate 50 provided to drive the VCMs, the FPC substrate 60 for data communication between the imaging element 20 and the main board, and the FPC substrate 70 for supply of power to the imaging element 20 are used.

FPC Substrate 50

A large current "I" flows to the FPC substrate 50 to generate the thrust of the VCMs. In this case, from the viewpoint of weakening a magnetic field "H" entering the Hall element h3 (the Hall element h3 which is closest to the FPC substrate 50 among the Hall elements h1, h2, and h3), it is desirable that a VCM driving pattern of the FPC substrate 50 is disposed away from the Hall element h3. Note that even in a case where the FPC substrate 50 is routed to be close to the Hall element h3, there is no problem in the case of a layout (disposition) in which influence is less likely to be exerted by the electromagnetic noise from the VCM driving pattern.

Figure 12:
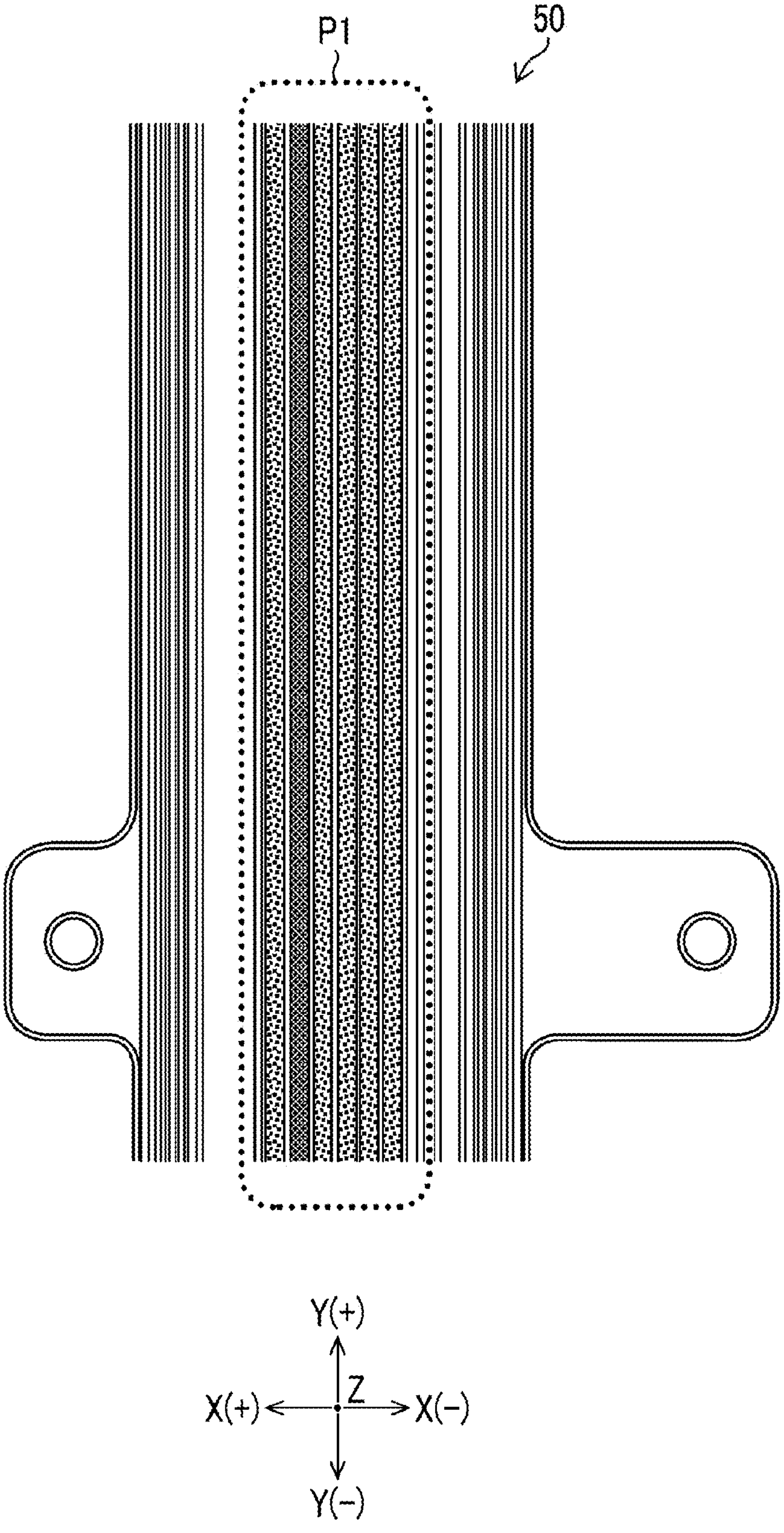
FIG. 12 is an explanatory view showing a pattern disposition example of the FPC substrate for reduction of the strength of a magnetic field.

FIG. 12 is an explanatory view showing a pattern disposition example of the FPC substrate 50 for reduction of the strength "H" of the magnetic field entering the Hall element h3.

FIG. 12 shows a state where a VCM driving pattern region P1 (the pattern region P1 where a larger current "I" flows than in other patterns), which is a central region surrounded by a dotted line and is one of a plurality of patterns of the FPC substrate 50, is disposed away from the Hall element h3.

By adopting the above-described pattern disposition for the FPC substrate 50, it is possible to weaken the magnetic field "H" entering the Hall element h3 from the VCM driving pattern region P1 of the FPC substrate 50. Therefore, it is possible to reduce the influence of electromagnetic noise caused by the FPC substrate 50.

FPC Substrate 60

The FPC substrate 60 does not have a high-speed communication signal pattern through which a large current "I" flows but has patterns in which currents "I" flow in opposite directions. Therefore, it is desirable to weaken the magnetic field "H" entering the Hall element h3 by canceling out the magnetic field by arranging these patterns in parallel. Note that even in a case where the FPC substrate 60 is routed to be close to the Hall element h3, there is no problem in the case of a layout in which influence is less likely to be exerted by the electromagnetic noise from each pattern.

Figure 13:
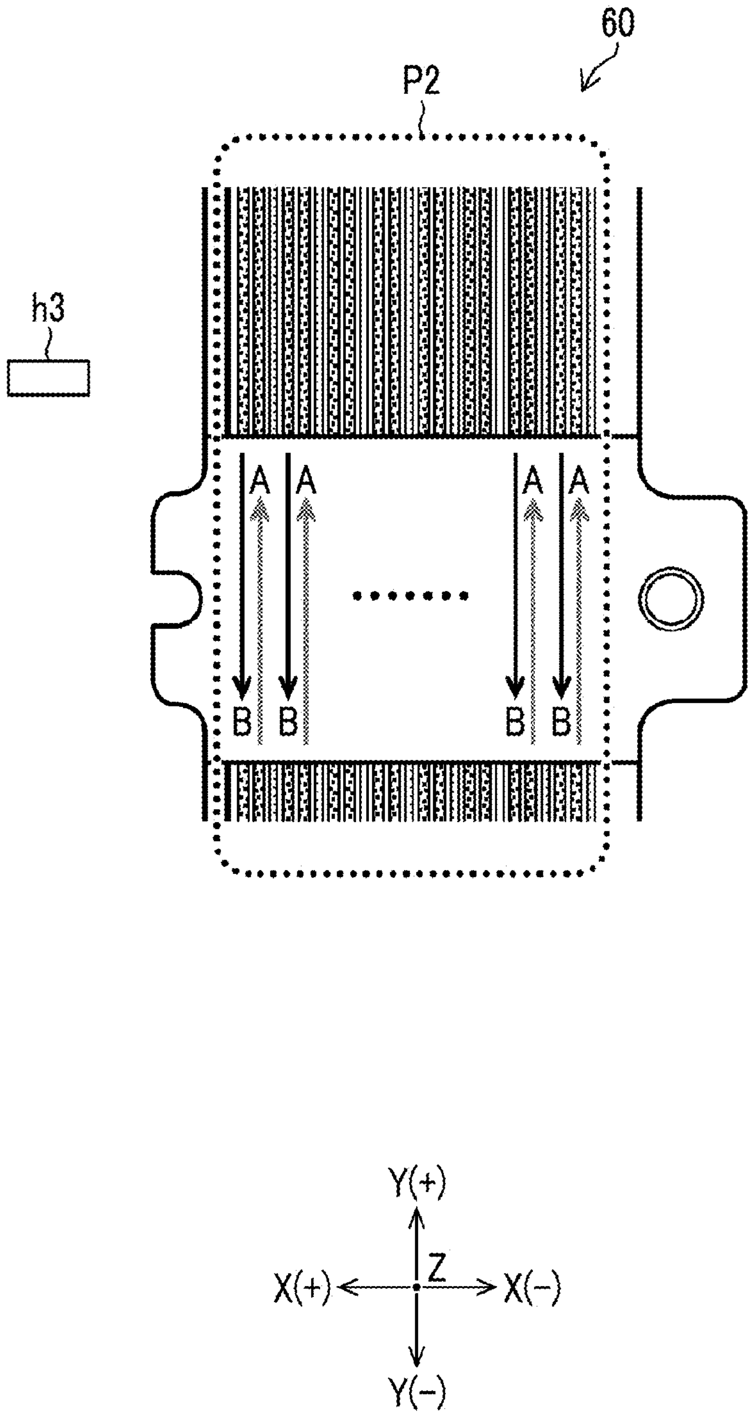
FIG. 13 is an explanatory view showing a pattern disposition example of the FPC substrate for reduction of the strength of a magnetic field.

FIG. 13 is an explanatory view showing a pattern disposition example of the FPC substrate 60 for reduction of the strength "H" of the magnetic field entering the Hall element h3.

According to FIG. 13, the FPC substrate 60 includes a pattern region P2 in which currents "I" flow through wiring lines in opposite directions. In the pattern region P2, wiring lines (first wiring lines) represented by a reference numeral "A" are wiring lines through which currents flow in a direction from the main board to the circuit board 22 of the imaging element 20 which is a first direction and wiring lines (second wiring lines) represented by a reference numeral "B" are wiring lines through which currents flow in a direction from the circuit board 22 to the main board which is a second direction. Note that in FIG. 13, the wiring lines with arrow marks are shown to show directions in which currents flow through the wiring lines. As shown in FIG. 13, the wiring lines (the first wiring lines) through which the currents flow in the first direction and the wiring lines (the second wiring lines) through which the currents flow in the second direction are alternately disposed.

By adopting the above-described pattern disposition for the FPC substrate 60, it is possible to weaken the magnetic field "H" entering the Hall element h3 from the pattern region P2 of the FPC substrate 60. Therefore, it is possible to reduce the influence of electromagnetic noise caused by the FPC substrate 60.

FPC Substrate 70

At the FPC substrate 70, a large current "I" flows to a digital power source and an analog power source of the imaging element 20. From the viewpoint of weakening the magnetic field "H" entering the Hall element h3, it is desirable that the patterns of the FPC substrate 70 for the digital power source and for the analog power source are disposed to be separated from the Hall element h3. Note that even in a case where the FPC substrate 70 is routed to be close to the Hall element h3, there is no problem in the case of a layout in which influence is less likely to be exerted by the electromagnetic noise from these patterns. In addition, since currents flowing in a power supply pattern and a ground pattern flow in opposite directions, it is desirable to arrange these patterns in parallel to reduce the influence of electromagnetic noise.

Figure 14:
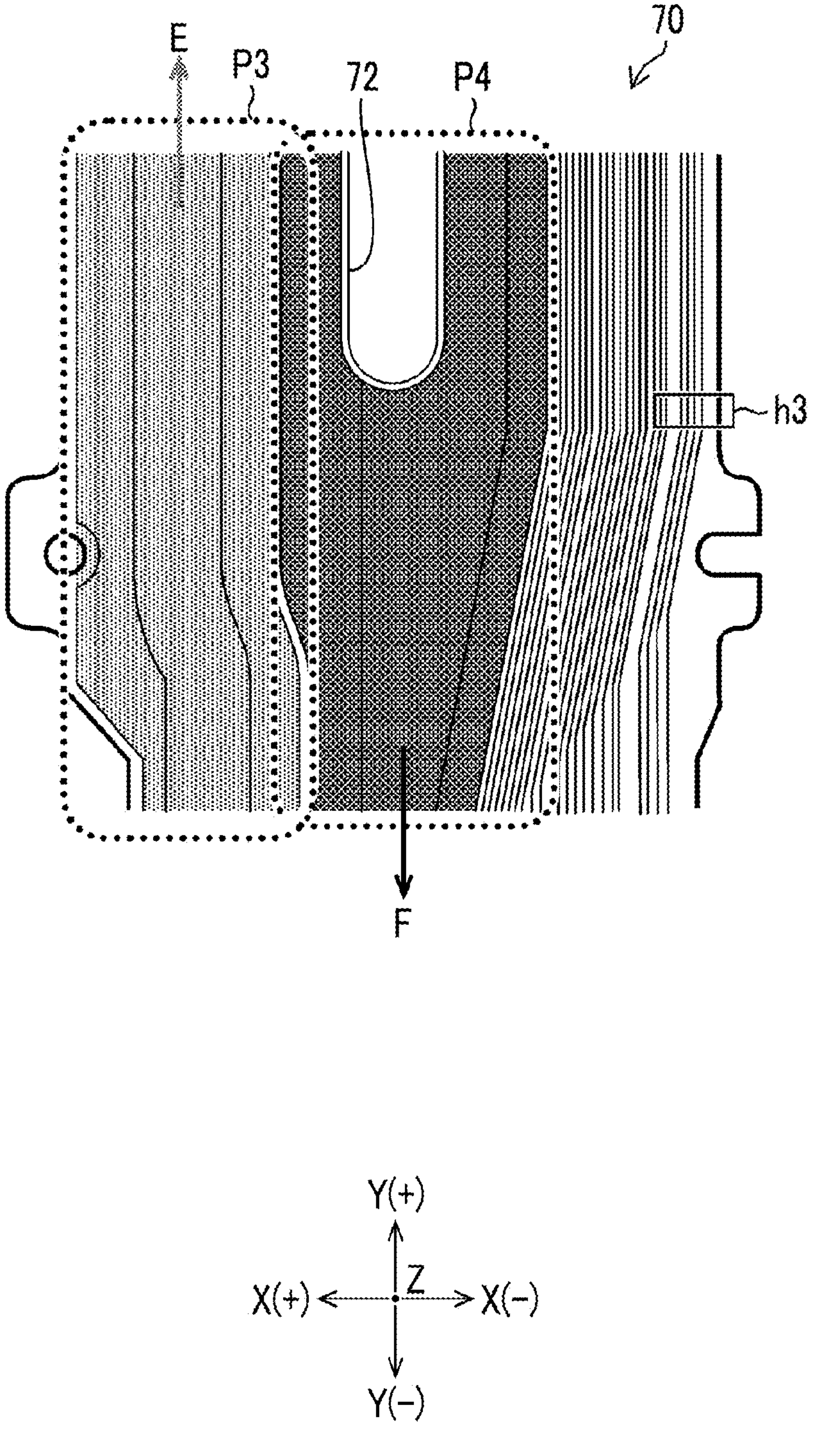
FIG. 14 is an explanatory view showing a pattern disposition example of the FPC substrate for reduction of the strength of a magnetic field.

FIG. 14 is an explanatory view showing a pattern disposition example of the FPC substrate 70 for reduction of the strength "H" of a magnetic field.

According to FIG. 14, a pattern region P3 for the digital power source the analog power source out of patterns of the FPC substrate 70 is disposed to be separated from the Hall element h3 by a larger distance than a distance by which a ground pattern region P4 is separated from the Hall element h3. In addition, the pattern region P3 and the ground pattern region P4, of which the line width is large and through which a large current flows, are arranged in parallel so that currents flowing in the pattern regions flow in opposite directions.

The pattern region P3 functions as a first wiring portion where a collection of first wiring lines, through which currents flow in a direction from the main board toward the circuit board 22 which is a first direction represented by an arrow E, is disposed. In addition, the ground pattern region P4 functions as a second wiring portion where a collection of second wiring lines, through which currents flow in a direction from the circuit board 22 to the main board which is a second direction represented by an arrow F, is disposed. The pattern region P3 and the pattern region P4 are disposed to be adjacent to each other.

By adopting the above-described pattern disposition for the FPC substrate 70, it is possible to weaken the magnetic field "H" entering the Hall element h3 from the pattern regions P3 and P4. Therefore, it is possible to reduce the influence of electromagnetic noise caused by the FPC substrate 70.

In a case where the pattern disposition of the FPC substrates 50, 60, and 70 is optimized such that the influence of electromagnetic noise is reduced, it is possible to route the FPC substrates 50, 60, and 70 into the magnetic circuits of the Hall sensors. That is, the size of the BIS can be reduced.

Next, Requirement 3 described above will be examined.

The output of a magnetic circuit of a Hall sensor can be estimated through electromagnetic field analysis. In the case of designing a magnetic circuit of a Hall sensor, there are three requirements that are "size reduction", "large Hall output", and "excellent Hall linearity". The Hall output is an indicator of the level of position detection resolution, and the Hall linearity is an indicator of the degree to which a position detection error is less likely to occur. In the case of a layout in which an FPC substrate is routed into a magnetic circuit of a Hall sensor for reduction of the size of the BIS, it is desirable to adopt a layout in which the FPC substrate is routed between the Hall element and a magnet.

Next, to route the FPC substrate between the Hall element and the magnet, two Requirements 3-1 and 3-2 as follows are to be considered.

3-1: The Hall element and the FPC substrate are separated from each other by a distance "r" such that no influence is exerted by electromagnetic noise.

3-2: The magnet and a movable member (the FPC substrate) of the BIS are separated from each other by a distance "d" such that the magnet and the movable member do not come into contact with each other (no frictional load is generated) regardless of the postures thereof and in-plane positions where the magnet and the movable are driven.

Therefore, it is desirable to determine an interval between the Hall element and the magnet to match above-described Requirements 3-1 and 3-2 and to optimize a gap between a pair of magnets sensitive to Hall output and Hall linearity so that a small magnetic circuit that is less likely to be influenced by electromagnetic noise is achieved. In addition, regarding the optimization of the gap between the pair of magnets, it is desirable to perform design and adjustment such that performance with an increase in Hall output is achieved with necessary minimum linearity. Here, the pair of magnets refers to the magnets M (refer to FIG. 5 and the like) in the shake correction device 1 of the present example.

Figure 15:
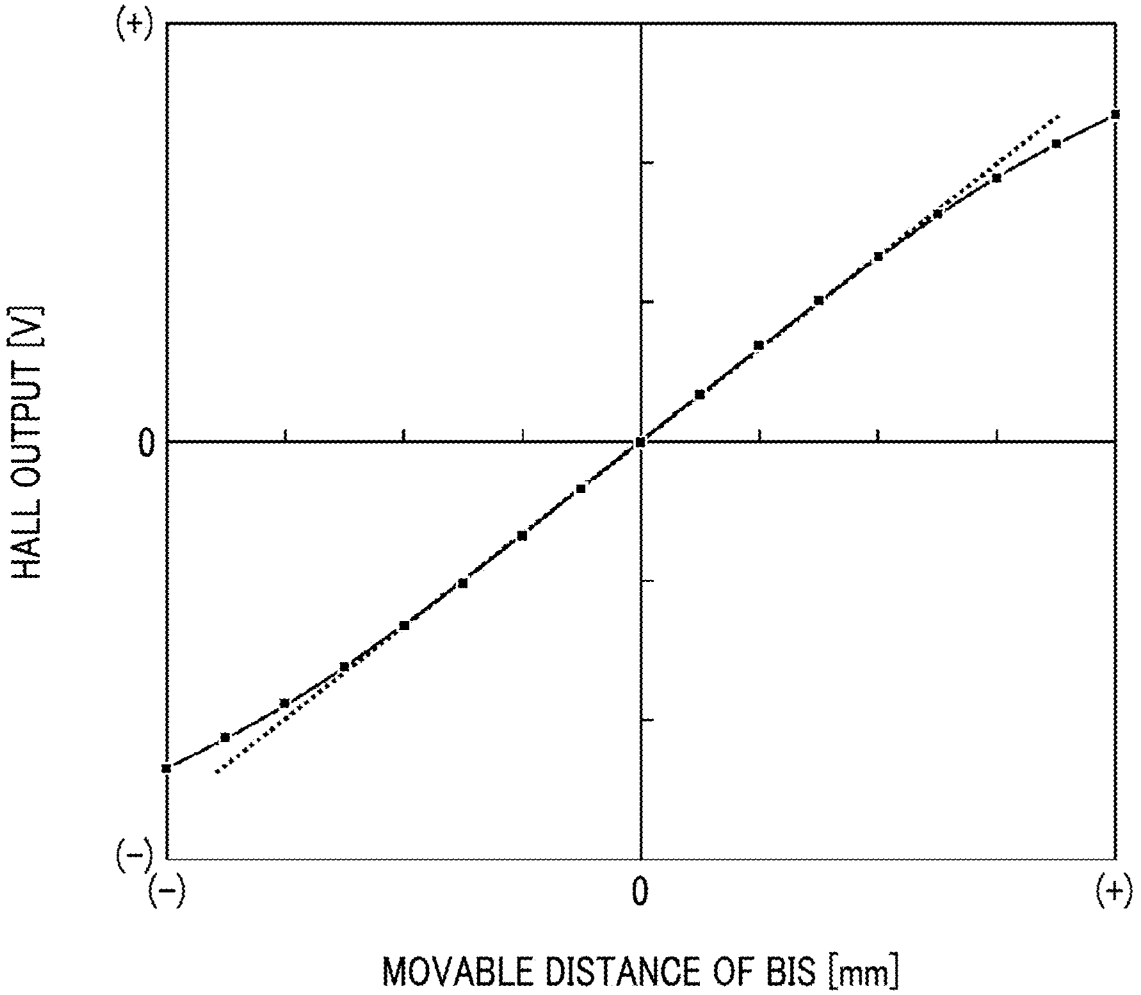
FIG. 15 is a graph showing a relationship between Hall output and the movable distance of a BIS.

FIG. 15 is a graph showing a relationship between Hall output and the movable distance of the BIS. As shown in FIG. 15, Hall output (V) and the movable distance (mm) of the BIS are in a relationship of being substantially proportional to each other. In addition, in a case where linearity is high, a position detection error is small, and in a case where Hall output (V) is large, the level of position detection resolution is high.

Figure 16:
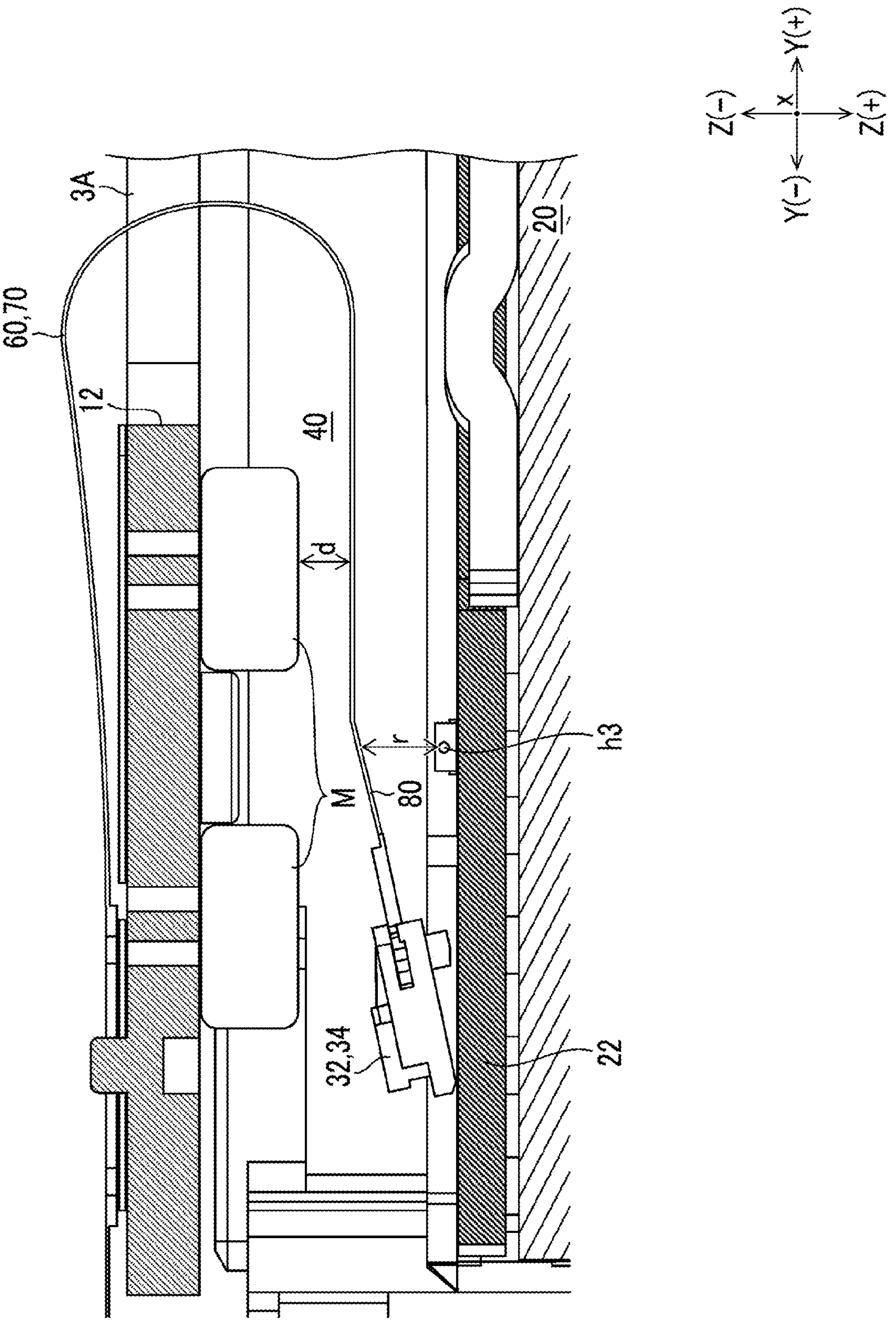
FIG. 16 is an explanatory diagram for description of design requirements for disposition of the FPC substrates between a Hall element and magnets.

FIG. 16 is an explanatory diagram for description of design requirements for disposition of the FPC substrates 60 and 70 between the Hall element h3 and the magnets M (a gap 40 in the direction Z).

As shown in FIG. 16, the Hall element h3 is disposed on the rear surface side of the circuit board 22 and the FPC substrates 60 and 70 are routed from a rear surface of the circuit board 22. Since such a layout is adopted, the size of the BIS is reduced in comparison with a configuration in which the FPC substrates are routed from a side surface side of the circuit board 22.

Among the FPC substrates 50, 60, and 70, the FPC substrates 60 and 70 are connected to the connectors 32 and 34 on the circuit board 22. Therefore, it is effective for the reduction in size of the BIS to dispose the FPC substrates 60 and 70 by using the gap 40 that is on the rear surface side of the circuit board 22. In addition, it is more desirable that the FPC substrate 50 is also disposed in the gap 40.

As described above, with the FPC substrates 60 and 70 disposed between the Hall element h3 and the magnets M, the size of the BIS can be reduced.

Comparative Example

Figure 17:
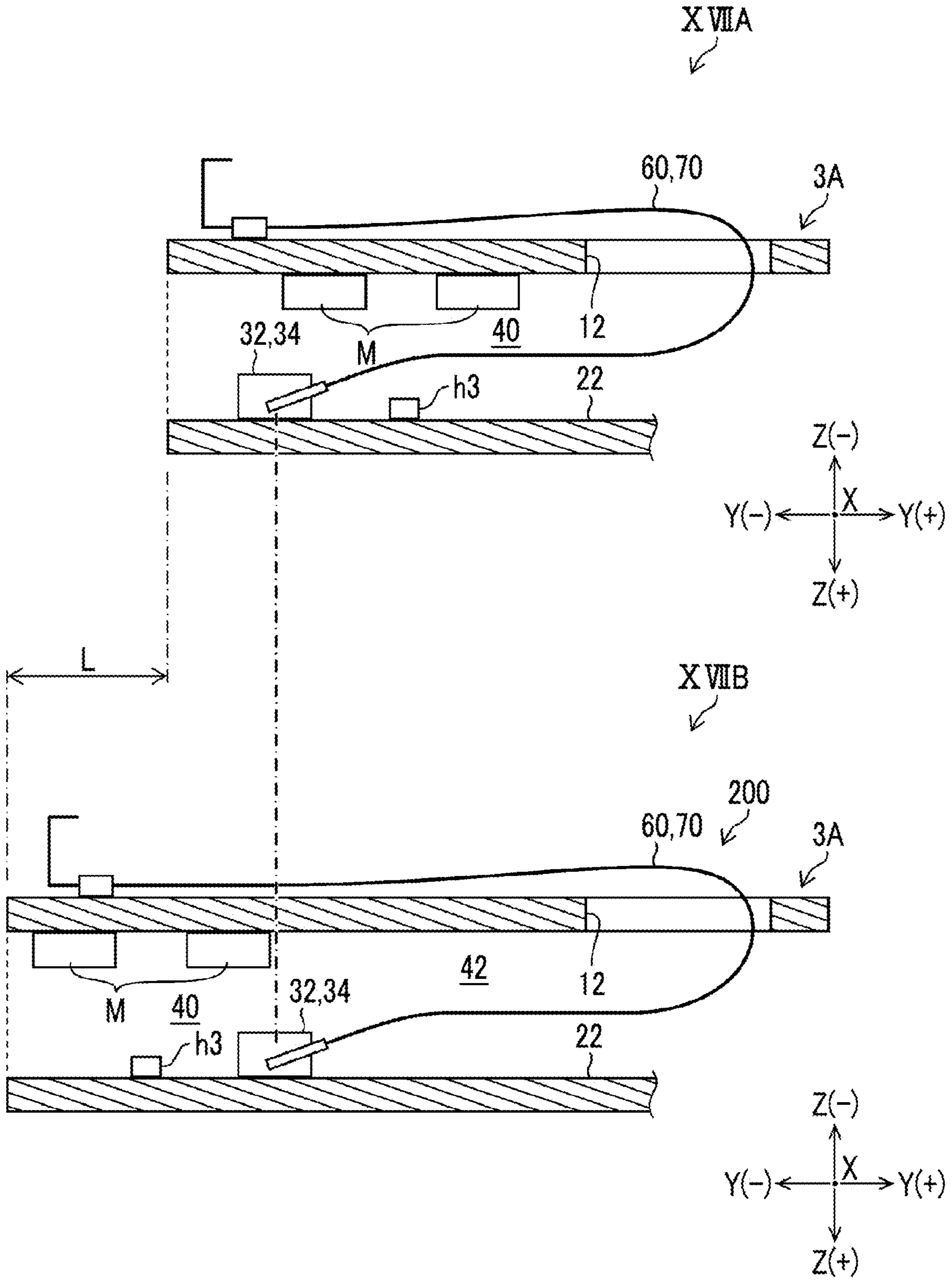
FIG. 17 is an explanatory diagram for description of comparison between a shake correction device of an embodiment and a shake correction device of a comparative example.

Here, regarding the reduction in size of the shake correction device, the shake correction device 1 according to the embodiment which is shown in XVIIA of FIG. 17 and a shake correction device 200 according to a comparative example which is shown in XVIIB of FIG. 17 will be described.

For the shake correction device 1 of the embodiment, a configuration in which the FPC substrates 60 and 70 are disposed between the Hall element h3 and the magnets M is adopted.

On the other hand, in the case of the shake correction device 200 of the comparative example, the FPC substrates 60 and 70 are not disposed in a gap (the gap 40) between the Hall element h3 and the magnets M, and are disposed in a gap (a gap 42) between the yoke 3A and the circuit board 22.

In the shake correction device 200, the Hall element h3 is disposed on a side, to which the Y (−) direction extends, with respect to the connectors 32 and 34, and the magnets M are disposed at positions facing the Hall element h3.

In a case where the positions of the connectors 32 and 34 in the direction Y are made the same as each other in the case of comparison between the sizes of the shake correction device 1 and the shake correction device 200, the length of the yoke 3A of the shake correction device 200 is larger than the length of the yoke 3A of the shake correction device 1 in the direction Y since the Hall element h3 is disposed on the side, to which the Y (−) direction extends, with respect to the connectors 32 and 34 (the length of the yoke 3A of the shake correction device 200 is larger than the length of the yoke 3A of the shake correction device 1 by a length L).

Therefore, in the case of the shake correction device 1 of the embodiment, since a configuration in which the FPC substrates 60 and 70 are disposed between the Hall element h3 and the magnets M is adopted, size reduction corresponding to the length L can be achieved in compared with the shake correction device 200 of the comparative example.

Meanwhile, the Hall element h3 is provided on the rear surface side of the circuit board 22. In addition, is desirable that the Hall element h3 is disposed in the region T2 (refer to FIG. 18) of the imaging element 20 in a view of the imaging element 20 as seen in the direction along the optical axis K, it is more preferable that the Hall element h3 is disposed in the pixel region T1 of the imaging element 20, and it is more preferable that the Hall element h3 is disposed near the center P of the imaging element 20. Accordingly, it is possible to improve the followability of roll position control.

Figure 18:
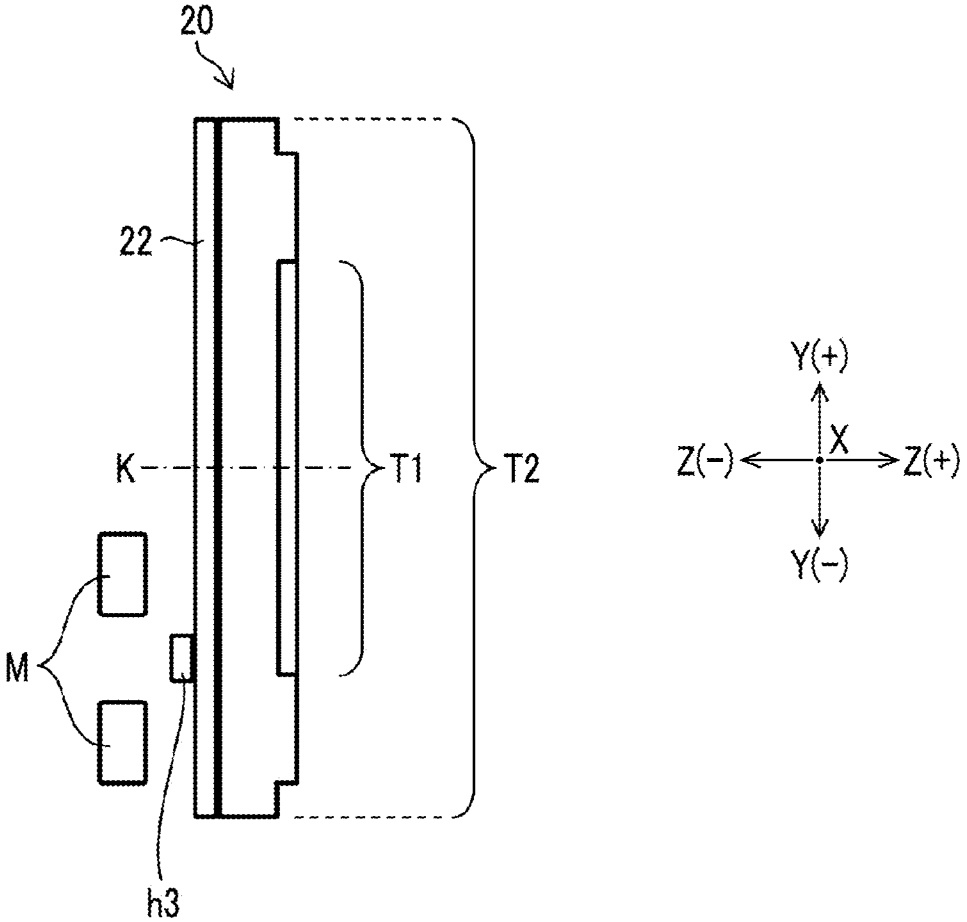
FIG. 18 is a view showing a position at which the Hall element is disposed with respect to an imaging element.

FIG. 18 is a view showing a position at which the Hall element h3 is disposed with respect to the imaging element 20. In FIG. 18, the Hall element h3 is disposed in the pixel region T1 of the imaging element 20 in a view of the imaging element 20 as seen in the direction along the optical axis K. The way in which the Hall element h3 is disposed is not limited thereto as long as the Hall element h3 may be disposed in the region T2 of the imaging element 20.

Meanwhile, in a case where the Hall element h3 is brought close to other mounted components, the Hall element h3 is influenced by electromagnetic noise generated from the other components. Therefore, although it is possible to take a countermeasure for electromagnetic noise by designing a substrate on an assumption that the vicinity of the Hall element h3 is a component mounting prohibited area, another problem such as a decrease in size of a component mounting area on the circuit board 22 may occur.

Therefore, in order to solve the above-described problem, tilt-type connectors (to which FPC substrates are diagonally inserted) as shown in FIG. 16 are used as the connectors 32 and 34 to which the FPC substrates 60 and 70 are connected, the other end sides of the FPC substrates 60 and 70 are provided with tilt portions 80 that are inclined diagonally toward the tilt type connectors 32 and 34, and the tilt portions 80 are diagonally connected to the connectors 32 and 34. According to this configuration, there are two advantages as follows in comparison with right angle type connectors (to which FPC substrates are inserted in parallel). The tilt portions 80 are examples of a tilt portion according to the embodiment of the present invention.

First advantage: Since the distance "r" between the FPC substrates 60 and 70 and the Hall element h3 can be made large, the influence of electromagnetic noise can be suppressed. Accordingly, it is possible to improve the performance of the BIS. As a result, it is possible to achieve both the reduction in size and the high performance of the BIS in conjunction with the configuration in which the FPC substrates 60 and 70 are disposed between the Hall element h3 and the magnets M.

Figure 19:
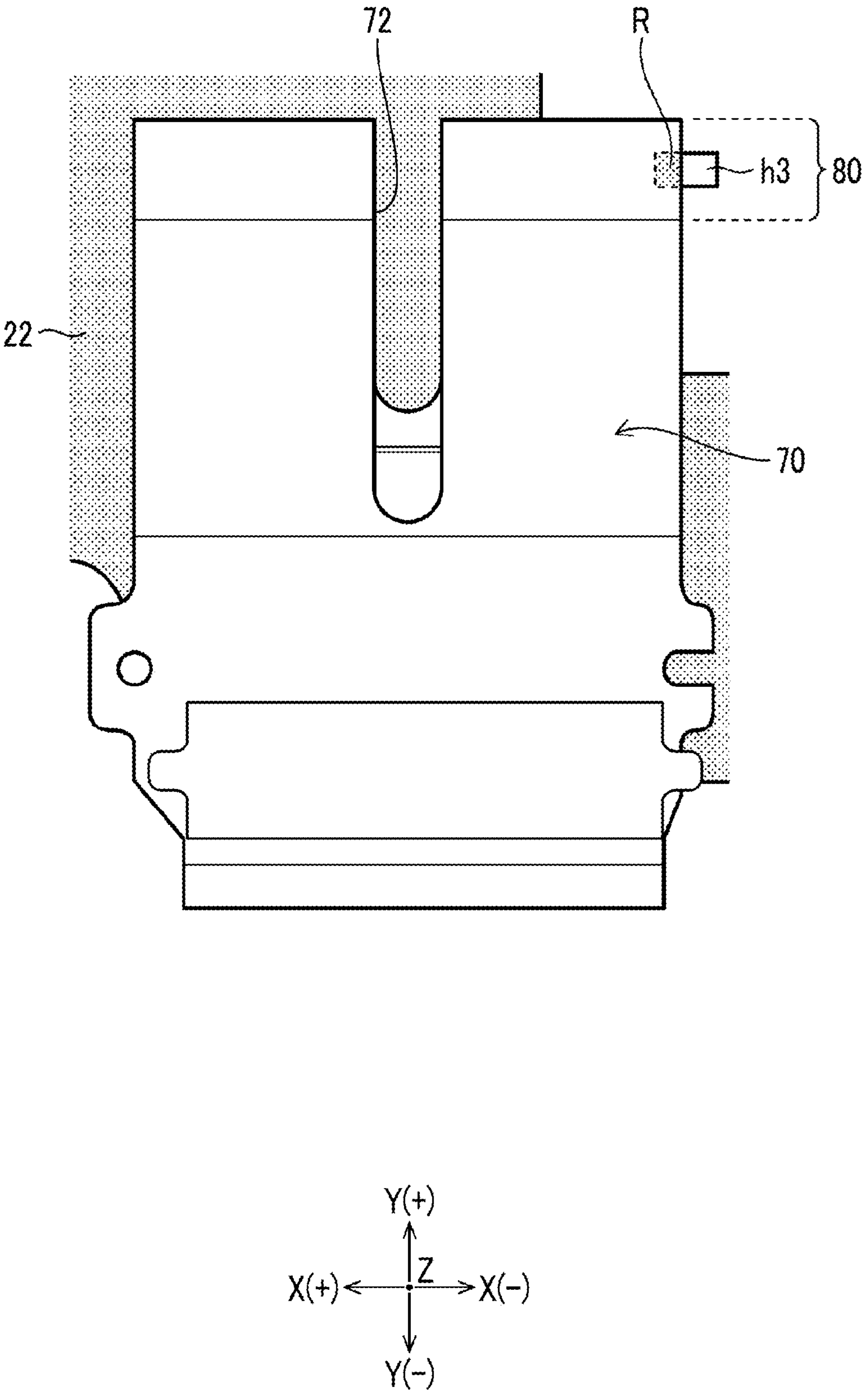
FIG. 19 is an explanatory view in which a tilt portion and the Hall element are disposed to overlap each other as seen in a direction Z.

In this case, it is desirable that an overlap region S where the Hall element h3 and the tilt portion 80 overlap each other at least partially in a view of the imaging element 20 as seen in the direction (the Z (+) direction) along the optical axis K is provided as shown in FIG. 19. FIG. 19 shows a view in which the Hall element h3 and the tilt portion 80 of the FPC substrate 70 partially overlap each other as seen in the direction Z. According to this configuration, the distance "r" between the FPC substrate 70 and the Hall element h3 can be made large.

Second advantage: On the circuit board 22, mounted components can be densely disposed up to the vicinity of inlets of the connectors 32 and 34.

Figure 20:
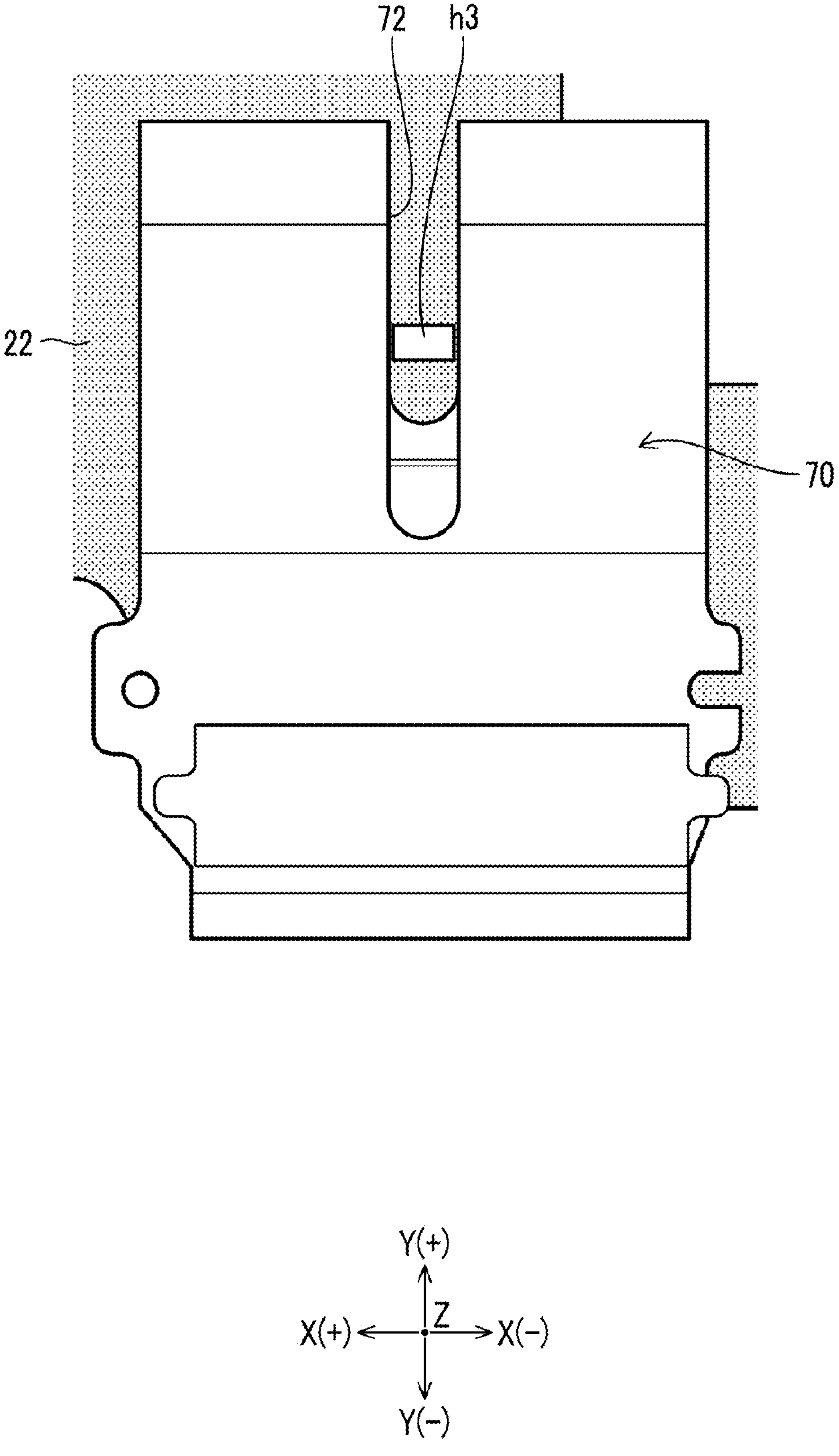
FIG. 20 is a view showing an FPC substrate provided with a slit as seen from the rear surface side.

In addition, in order to reduce the spring reaction force of a FPC substrate, forming a slit in the FPC substrate is devised. In this case, as shown in FIG. 20, it is desirable to form a slit 72 in the FPC substrate 70 that is routed near the Hall element h3.

The slit 72 is formed along a longitudinal direction of the FPC substrate 70. In addition, it is desirable that at least a portion of the Hall element h3 is disposed in the slit 72 in a view of the imaging element 20 as seen in the direction along the optical axis K and it is more desirable that the entire Hall element h3 is disposed in the slit 72 in a view of the imaging element 20 as seen in the direction along the optical axis K. Accordingly, it is possible to reduce the influence of electromagnetic noise while reducing the spring reaction force of the FPC substrate 70, which is effective.

In addition, the spring reaction force of the FPC substrate can be reduced by reducing the total thickness of the FPC substrate to reduce each of bending and the torsional rigidities. In addition, by reducing a support portion of the FPC substrate with a change from the form of a support portion supporting a bent R portion and a linear portion to the form of a support portion supporting the bent R portion only, it is possible to reduce the torsional reaction force of the FPC substrate. In a case where a plurality of such idea and other ideas are combined, the size of the bent R portion of the FPC substrate can be reduced.

Although the shake correction device and the imaging apparatus according to the embodiment have been described above, the present invention may be improved or modified in some ways without departing from the gist of the present invention.

EXPLANATION OF REFERENCES

1: shake correction device
2: movable member
3: fixation member
3A: yoke
3B: yoke
4: screw
10: base
12: through-hole
14: FPC substrate
16A: planar plate
16B: planar plate
16C: planar plate
18: magnetic sticking plate
20: imaging element
20A: light-receiving surface
22: circuit board
24: base
25: opening portion
26: rolling body
28A: recess portion
28B: recess portion
28C: recess portion
32: connector
34: connector
40: gap
50: FPC substrate
60: FPC substrate
70: FPC substrate
100: digital camera
102: camera body
104: lens
106: imaging optical system
108: imaging element drive unit
110: analog front end
112: image processing unit
114: movement detection sensor
116: operation portion
118: display unit
120: system control unit
200: shake correction device
C1: coil
C2: coil
C3: coil
h: Hall element
h1: Hall element
h2: Hall element
h3: Hall element
M: magnet
Mv1: magnet
Mv2: magnet
Mv3: magnet
K: optical axis
P: center
OA: optical axis
X: direction
Y: direction
Z: direction
r: distance
d: distance
H: strength of magnetic field
S: overlap region

What is claimed is:

1. A shake correction device comprising:
a magnet and a Hall element for position detection; and
a flexible substrate that connects a movable member to which an imaging element is attached and a fixation member to each other,
wherein the flexible substrate is disposed between the Hall element and the magnet, and
the flexible substrate includes a slit formed along a longitudinal direction of the flexible substrate.

2. The shake correction device according to claim 1, wherein the flexible substrate is a flexible substrate for supply of power to the imaging element.

3. The shake correction device according to claim 2, further comprising, in addition to the flexible substrate for supply of power:
a flexible substrate for data communication through which communication of imaging data with respect to the imaging element is performed; and
a flexible substrate for a drive signal through which the drive signal is transmitted to the movable member.

4. The shake correction device according to claim 1, wherein the flexible substrate includes a tilt portion, and an overlap region where the Hall element and the tilt portion overlap each other at least partially in a view of the imaging element as seen in an optical axis direction is provided.

5. The shake correction device according to claim 4, wherein the tilt portion is diagonally connected to a connector portion.

6. The shake correction device according to claim 1, wherein at least a portion of the Hall element is disposed in the slit in a view of the imaging element as seen in an optical axis direction.

7. The shake correction device according to claim 1, wherein the Hall element is disposed in a region of the imaging element in a view of the imaging element as seen in an optical axis direction.

8. The shake correction device according to claim 7, wherein the Hall element is disposed in a pixel region of the imaging element.

9. The shake correction device according to claim 1, wherein the flexible substrate includes
a first wiring line through which a current flows in a first direction, and
a second wiring line through which a current flows in a second direction, and
the first wiring line and the second wiring line are alternately disposed.

10. The shake correction device according to claim 1, wherein the flexible substrate includes
a first wiring portion where a collection of first wiring lines through which currents flow in a first direction is disposed, and
a second wiring portion where a collection of second wiring lines through which currents flow in a second direction is disposed, and
the first wiring portion and the second wiring portion are disposed to be adjacent to each other.

11. The shake correction device according to claim 10, wherein the first wiring portion is disposed at a position farther from the Hall element than the second wiring portion is.

12. The shake correction device according to claim 11, wherein the flexible substrate includes the slit in a region where the second wiring portion is disposed.

13. An imaging apparatus comprising:
the shake correction device according to claim 1; and
an optical system that forms an optical image of a subject on the imaging element.

* * * * *